(12) United States Patent  (10) Patent No.: US 7,407,211 B2
Kunz  (45) Date of Patent: Aug. 5, 2008

(54) VEHICLE CARGO SLIDE-OUT

(75) Inventor: James R. Kunz, Creswell, OR (US)

(73) Assignee: Actuant Corporation, Butler, WI (US)

( * ) Notice: Subject to any disclaimer, the term of this patent is extended or adjusted under 35 U.S.C. 154(b) by 182 days.

(21) Appl. No.: 11/351,698

(22) Filed: Feb. 10, 2006

(65) Prior Publication Data

US 2006/0125269 A1    Jun. 15, 2006

Related U.S. Application Data

(62) Division of application No. 11/063,158, filed on Feb. 22, 2005, now Pat. No. 7,258,352.

(60) Provisional application No. 60/546,245, filed on Feb. 20, 2004.

(51) Int. Cl.
   *B60R 11/06* (2006.01)
(52) U.S. Cl. ............... 296/37.1; 296/37.6; 312/334.12
(58) Field of Classification Search ............ 296/37.6, 296/37.2, 37.1, 37.8, 37.12, 37.15, 37.14; 312/334.12; 280/769
   See application file for complete search history.

(56) References Cited

U.S. PATENT DOCUMENTS

| 4,948,169 | A * | 8/1990 | Amundson | ............ | 280/769 |
| 6,742,979 | B1 * | 6/2004 | Salazar | ............ | 414/522 |
| 2002/0033657 | A1 * | 3/2002 | Kim et al. | ............ | 312/334.12 |

\* cited by examiner

*Primary Examiner*—Joseph D Pape
(74) *Attorney, Agent, or Firm*—Quarles & Brady LLP

(57) ABSTRACT

A cargo slide-out for a vehicle includes a drawer slideable within a guide frame. Glides, such as rollers or sliders, are mounted to two sides of the drawer and to the associated sides of the guide frame so that at each side of the drawer at least one glide extends toward the guide frame and at least one extends toward the drawer. A sliding double-run track is disposed between the drawer and the guide frame at the two sides of the drawer. Sliding engagement of the tracks and glides connect the drawer to the guide frame and allow the drawer to slide out fully from the guide frame so that the user can access the back of the drawer. Preferably, the tracks each define a pair of v-shaped grooves and a pair of v-shaped rails matable with v-shaped surfaces of the glides.

20 Claims, 29 Drawing Sheets

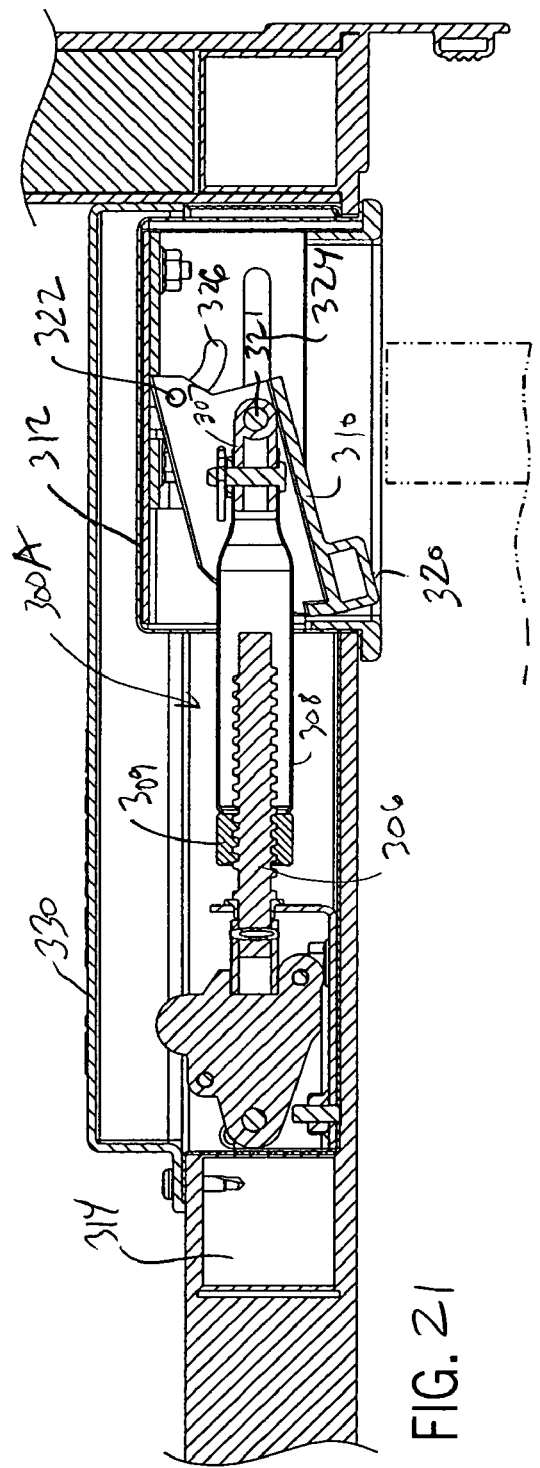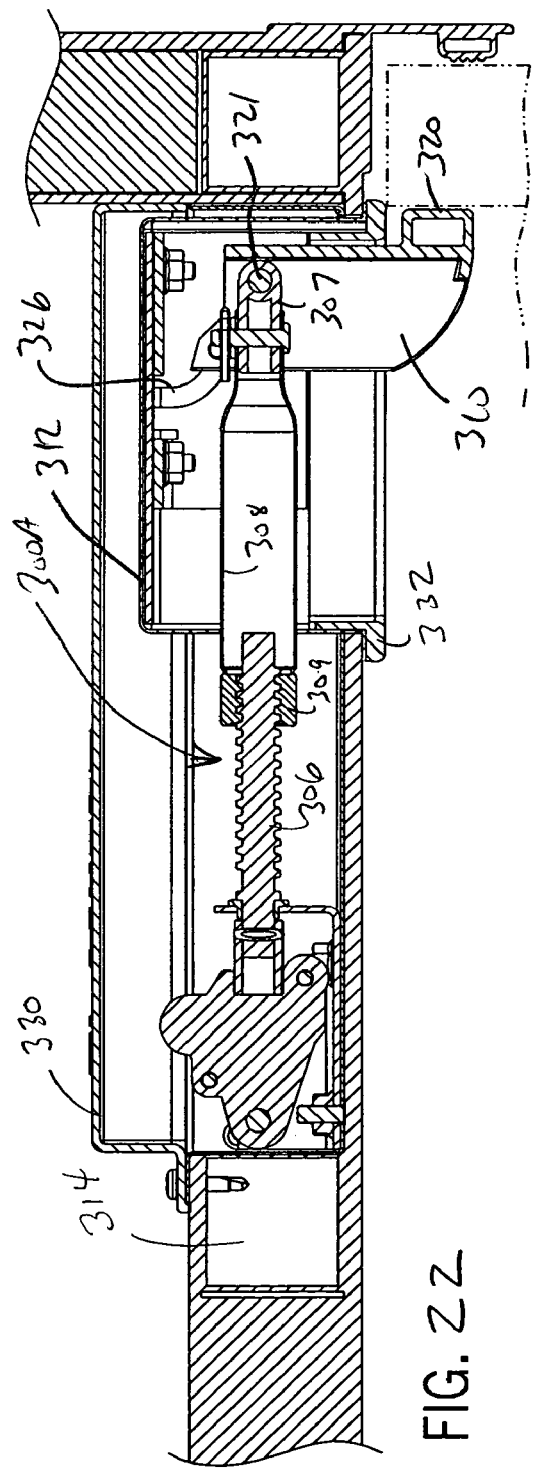

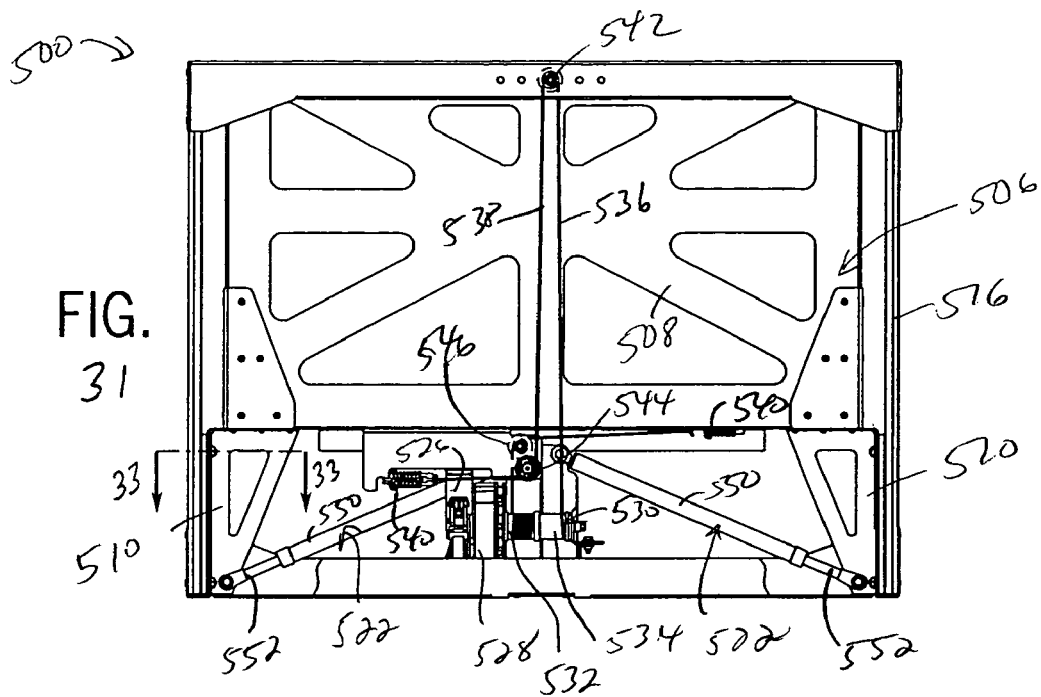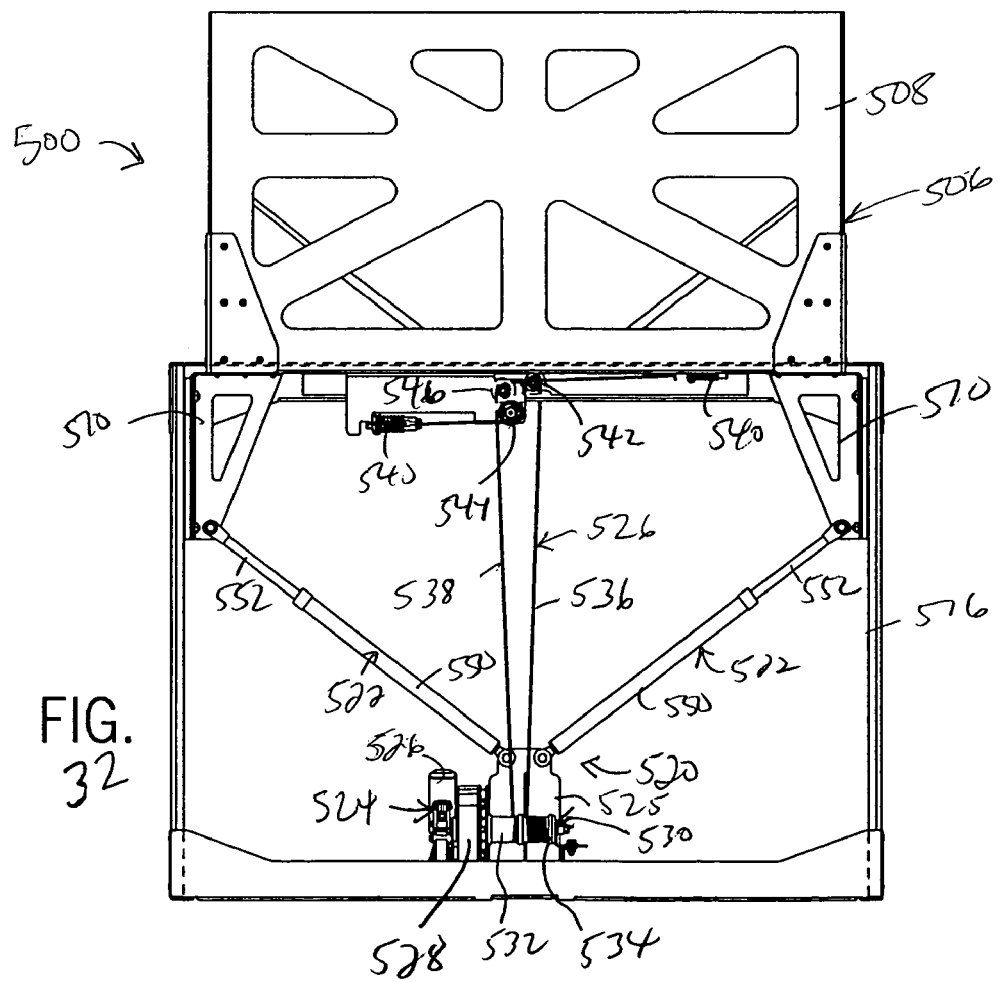

VEHICLE CARGO SLIDE-OUT

CROSS-REFERENCE TO RELATED APPLICATION

This application is a divisional application of U.S. application Ser. No. 11/063,158, filed Feb. 22, 2005, now U.S. Pat. No. 7,258,352, which claims benefit to U.S. provisional application Ser. No. 60/546,245, filed on Feb. 20, 2004.

STATEMENT OF FEDERALLY SPONSORED RESEARCH OR DEVELOPMENT

Not applicable.

BACKGROUND OF THE INVENTION

1. Technical Field

The present invention relates to vehicles and in particular to recreational vehicles.

2. Description of the Related Art

To increase the available interior space of recreational vehicles or trailers, the vehicle may have a slide-out section, such as rooms or closets. These slide-out sections usually include a floor, a roof, an end wall and one or more side walls. In the retracted position the roof, floor, and side walls are typically inside the stationary part of the vehicle, concealed from exterior view, and the end wall forms a portion of the vehicle's side wall. During transit, these sections are retracted and stored in the interior of the vehicle or trailer, with the exterior wall of the slide-out section being flush with the exterior of the vehicle or trailer. To use the slide-out section, the vehicle is first parked and leveled. The slide-out room is then slid outward from the vehicle, thereby increasing the interior space of the vehicle.

While the extendible section can increase the usable interior space of the vehicle considerably, space optimization remains an issue. Thus, ways to incorporate other space saving technology into the vehicle are sought. The challenge is primarily doing so without excessive weight to the vehicle and fitting the space saving components into the interior in a sensible way and without interfering with the movable components of the vehicle, such as the slide-out section(s).

The operating mechanisms for extending and retracting the slide-out sections are another area of concern. Various drive assemblies are known and can be manual or powered, including hydraulics, pneumatics, electronics, simple gearing mechanisms, sheave and pulley arrangements, or various combinations thereof.

The operating mechanism for extending and retracting the slide-out section relative to the vehicle may be fixed to the vehicle body and can include one or more sliding rails attached to the slide-out section. Typically, these sliding rails slide within rail supports fixed to the vehicle frame. Multiple sliding rails are typically utilized for wide slide-out sections. Such operating mechanisms of conventional slide-out room assemblies are large and can add significant cost and weight to a vehicle.

Another problem with vehicles having such slide-out sections is that the slide-out room may move considerably with respect to the rest of the vehicle during transit, for example, from riding over bumps, taking high-speed turns or making evasive maneuvers with the vehicle. In extreme cases, this can result in the slide-out section actually sliding away, or extending, from the vehicle during transit. Another problem is forming a tight seal between the slide-out section and the vehicle, particularly when the slide-out section is retracted, to keep out rain, insects and other foreign bodies. The sliding mechanism may not be sufficient to compress the gaskets or other seals around the vehicle opening to adequately seal off the interior.

Several solutions to overcome these problems have been developed in the prior art which work to limit the amount of play in the slide-out operating mechanism, however, these are generally inadequate by themselves. Stand alone latching or locking devices, therefore, have been devised to address these problems, but room still exists for improvement in this area.

SUMMARY OF THE INVENTION

The invention provides a cargo slide-out for a vehicle. The cargo slide-out has a drawer for containing vehicle cargo. The drawer is slideably mounted within a guide frame and the special track and glide arrangement allows the drawer to be fully extended so that a back end of the drawer can be brought to a front of the guide frame.

In one form, sets of glides are mounted at the two opposite sides of the drawer such that one or more glides extend from both sides of the drawer toward the guide frame and one or more glides extend from the guide frame toward both sides of the drawer. At least one track is disposed between the drawer and guide frame at both sides of the drawer to engage both of the drawer mounted and guide frame mounted glides at each side of the drawer.

Preferably, a single double-run track is disposed at each side of the drawer that is free to slide relative to one or both of the drawer and guide frame. The track can take various forms, but must have at least one rail for the drawer mounted glides to ride on and for the guide frame mounted glides to ride on. For example, the track can have two rails or grooves for each of the sets of glides, or it can have a groove receiving the drawer mounted glides and a rail made of an outer edge surface of the track for the guide frame mounted glides.

In one preferred form, the track is an extruded aluminum piece having a generally E-shaped cross-section. The track defines a pair of long grooves between two long rails, both of which preferably have a "V" configuration. The grooves can open to the same side of the track such that both receive vertically staggered glides mounted either to the drawer or the guide frame. The glides of the other would then ride along the rails.

As mentioned, the grooves and rails of each track are preferably v-shaped. That is, the outer rails, corresponding to the upper and lower legs of the "E" are bent to define either a "V" or inverted "V" shape, preferably the upper rail is an inverted "V" and the lower rail is an upright "V". The middle leg of the "E" then forks at two rails angling toward the outer rails such that two sideways "V" shaped grooves are defined.

The glides can be rollers rotatably mounted to the drawer and guide frame or they can be sliders fixedly mounted to each and made of a low friction material, such as an ultra high molecular weight polymer. In either case, the glides would provide surfaces for mating with the grooves/rails of the track. Preferably, the mating surface is in a "V" configuration, either inverted to define a peak or upright to define a valley, the latter being most preferred.

Thus, the cargo slide-out includes a drawer slideable within a guide frame. Glides, such as rollers or sliders, are mounted to two sides of the drawer and to the associated sides of the guide frame so that at each side of the drawer at least one glide extends toward the guide frame and at least one extends toward the drawer. A sliding double-run track is disposed between the drawer and the guide frame at the two sides of the drawer. Sliding engagement of the tracks and glides connect the drawer to the guide frame and allow the drawer to slide out fully from the guide frame so that the user can access the back of the drawer.

Preferably, at least a rear compartment of the drawer is shallow such that it is short enough to fit between the unused basement space of the vehicle extending between one or more of the long vehicle frame rails and the stationary floor of the vehicle.

The advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

BRIEF DESCRIPTION OF THE DRAWINGS

FIG. 21 is a partial sectional view taken along line 21-21 in FIG. 18 of the travel lock in the retracted position;

FIG. 22 is a partial sectional view taken along line 22-22 in FIG. 19 of the travel lock in the engaged position;

FIG. 31 is a rear plan view of the lift mount with a movable carriage shown in a stowed position;

FIG. 32 is a view similar to FIG. 31 albeit showing the carriage in an elevated;

DETAILED DESCRIPTION OF THE PREFERRED EMBODIMENTS

The present invention provides improvements to the functionality of passenger vehicles, such as a tow-along trailer or a self-propelled (motorhome) recreational vehicle, as well as other vehicles for use in construction, military, medical, education, mobile broadcast and other applications. These improvements are particularly suited for use in a vehicle having an extendable section, for example, a slide-out room or closet used to provide additional interior room space.

Figure 1:
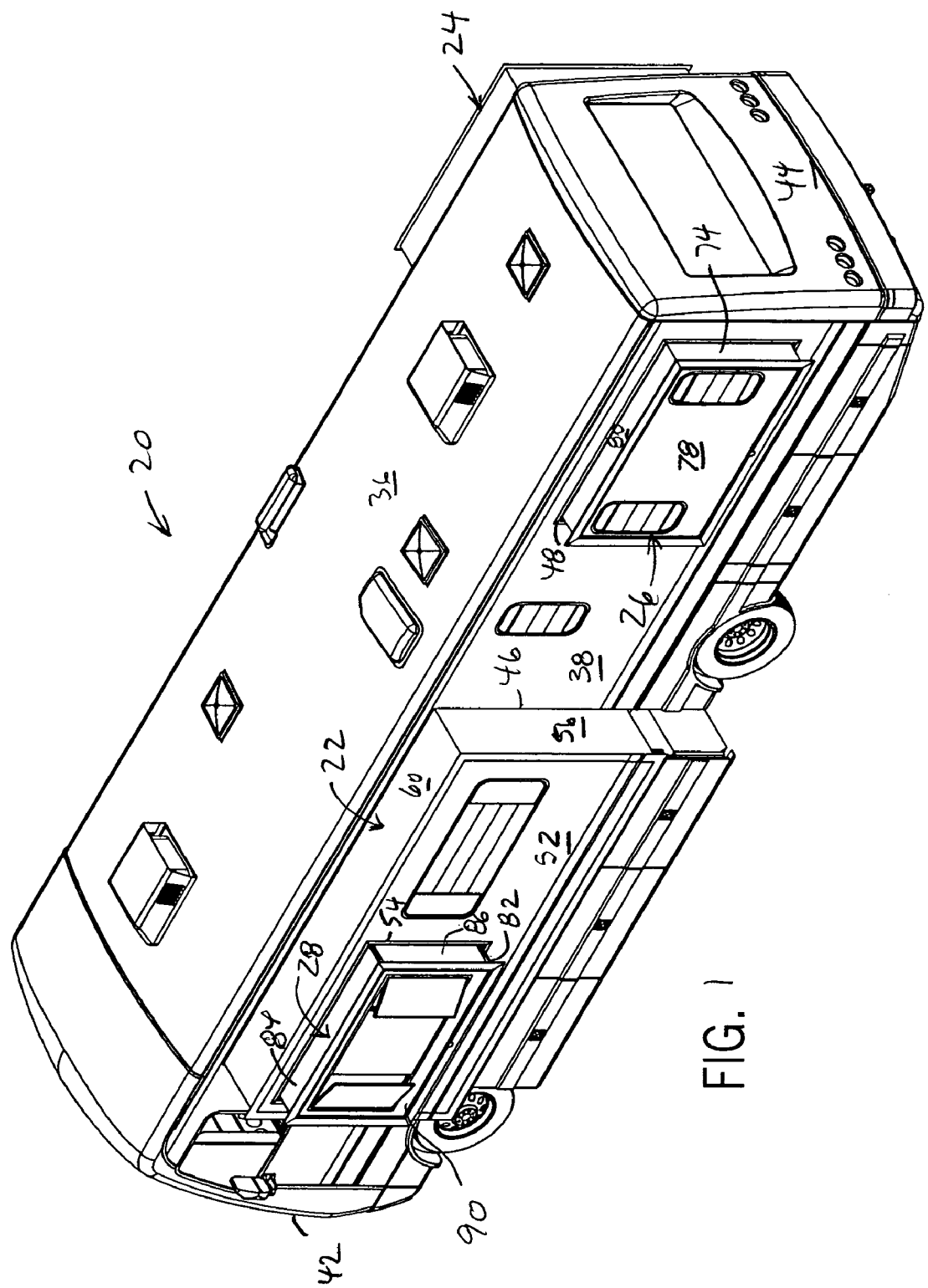
FIG. 1 is an exterior driver side rear perspective view of a recreational vehicle having extendible slide-out sections incorporating the present invention.
Figure 2:
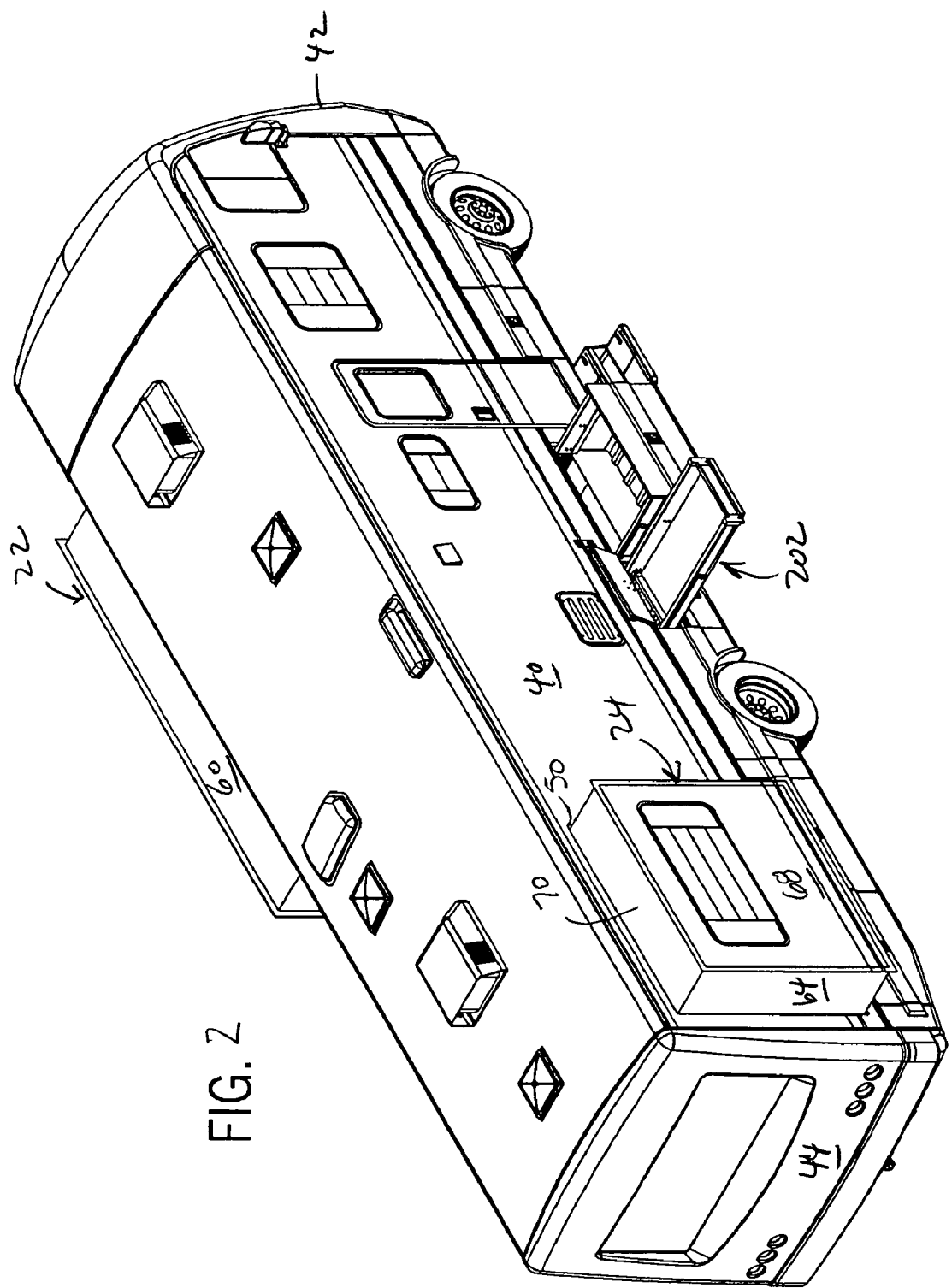
FIG. 2 is an exterior passenger side rear perspective view thereof.
Figure 3:
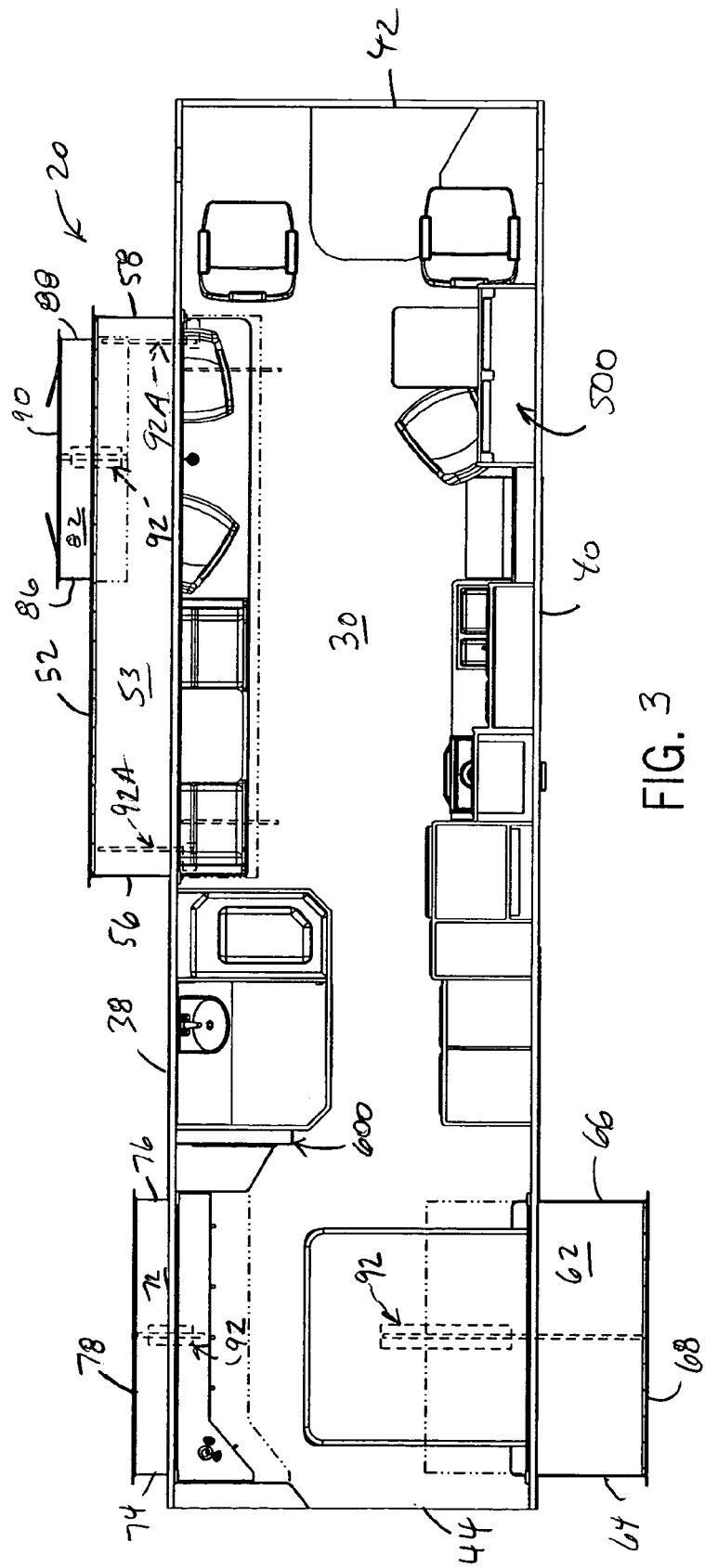
FIG. 3 is a top plan view showing the interior of the vehicle of FIG. 1.
Figure 4:
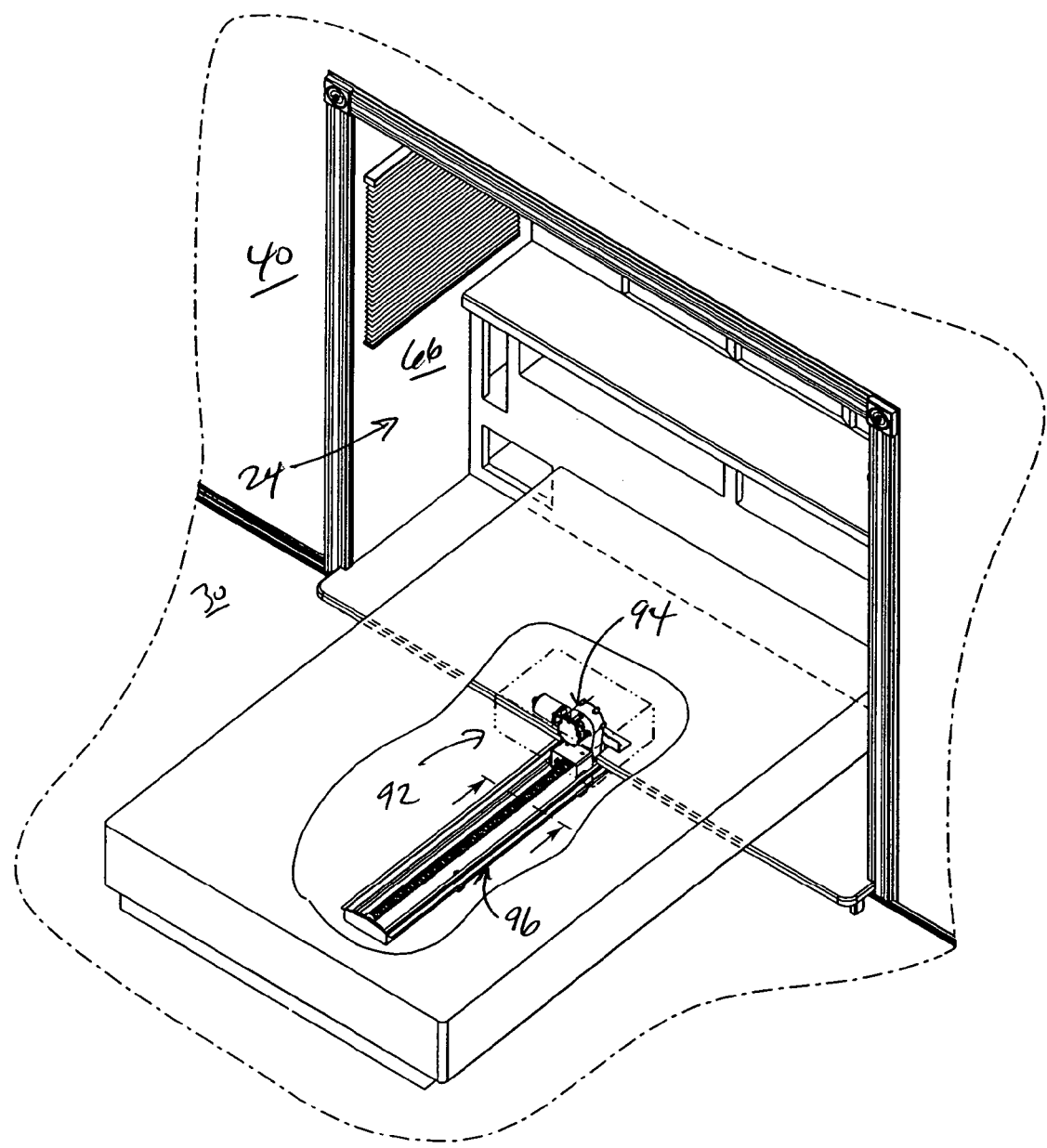
FIG. 4 is a partial interior perspective view of a slide-out bedroom cut-away to show its operating mechanism.
Figure 5:
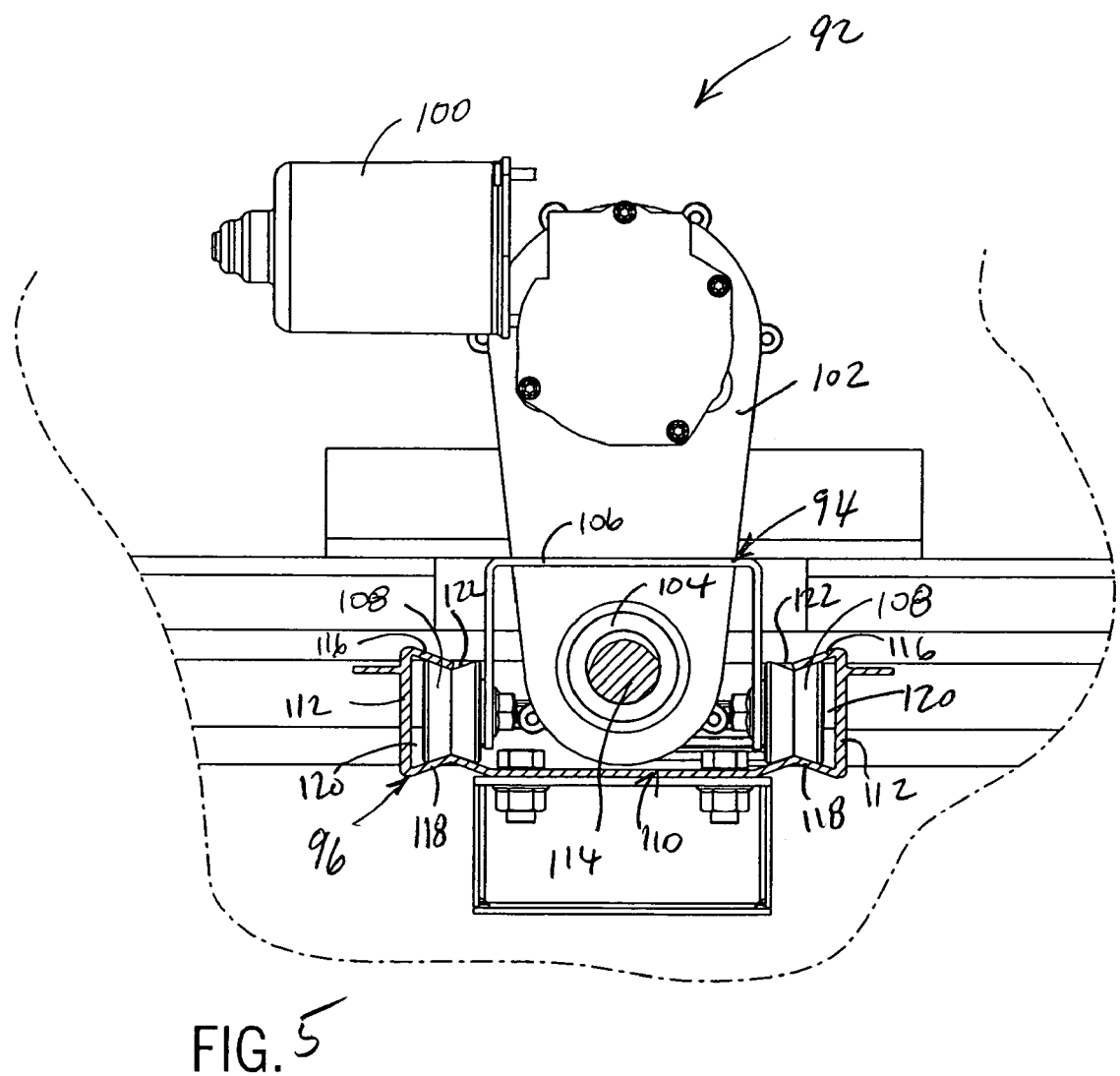
FIG. 5 is a partial side sectional view of the operating mechanism shown in FIG. 4.
Figure 6:
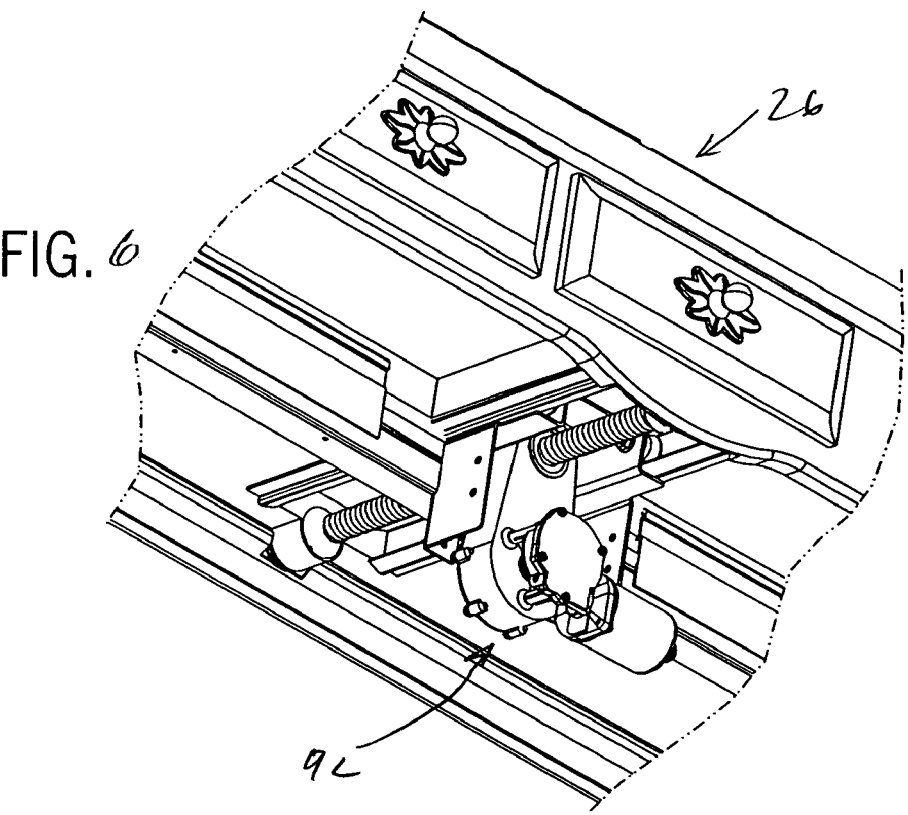
FIG. 6 is a partial interior bottom perspective view showing the operating mechanism for a slide-out vanity.
Figure 7:
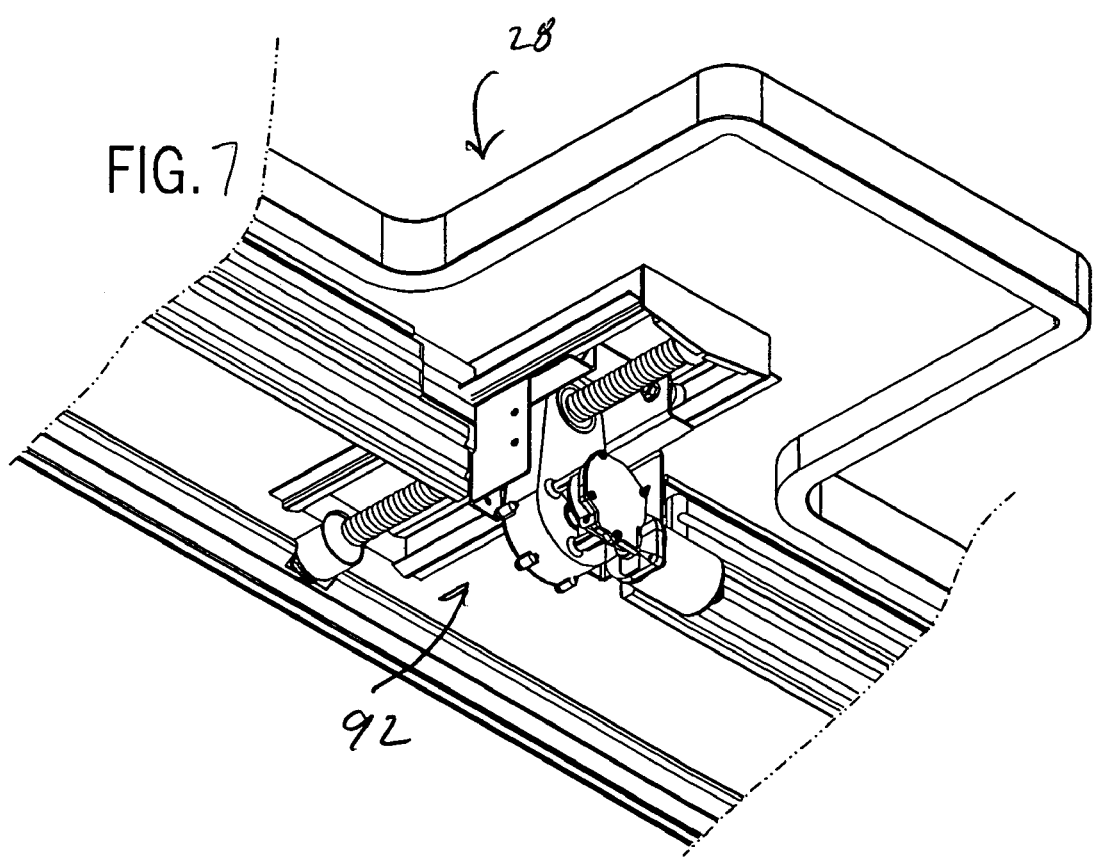
FIG. 7 is a partial interior bottom perspective view showing the operating mechanism for a slide-out window within the slide-out room shown in FIG. 4.

Referring now to FIGS. 1-3, a recreational vehicle 20 has a number of slide-out sections, including a slide-out room 22, a slide-out bedroom 24 and a slide-out vanity 26. Slide-out room 22 is a slide-out within a slide-out in that it has a slide-out box (or bay) window 28 that extends out from the slide-out room 22. All of the slide-out sections are slideably mounted relative to a stationary floor 30 supported by a frame 32 of the vehicle 20. The slide-out room 22 is a below the floor type in which its operating drive 34 is mounted below the stationary floor 30 of the vehicle. The slide-out vanity 26 and slide-out window 28 are similar but the drive is mounted below a counter or sill. The slide-out bedroom 24 is an above the floor type slide-out.

The vehicle 20 also has a roof 36 and four or more exterior walls 38, 40, 42 and 44. The slide-out room 22 and the slide-out vanity 26 are located at respective openings 46 and 48 in the long side wall 38, and the slide-out bedroom 24 is located at an opening 50 in the opposite side wall 40. The slide-out room 22 has an end wall 52 with an opening 54 where the slide-out window 28 is mounted.

In addition to end wall 52, the slide-out room 22 also has a movable floor 54, side walls 56 and 58 and ceiling 60. The slide-out bedroom similarly has a movable floor 62, side walls 64 and 66, end wall 68 and ceiling 70. The slide-out vanity 26 has a movable platform 72, side 74 and 76 and end 78 walls and ceiling 80, and the slide-out window 28 has bottom 82, top 84 and side 86 and 88 and 90 end walls.

Each slide-out section is extended and retracted by one or more compact operating mechanisms, referred to generally by reference number 92, that replace the large telescoping rails common in conventional vehicles with extendible rooms. A slide-out section of sufficiently low weight and narrow width, for example 10 feet and less, can be moved by a single operating mechanism located at the mid-point of its width. Larger width slide-out sections can have two or more operating mechanisms near opposite sides of the section and possibly also one in the middle. If desired to reduce variation in extension from side to side, the two or more operating mechanisms can be synchronized, either electronically or mechanically, for example using a coupling shaft between the drives. The latter would afford the option of using one higher capacity motor drive to run the multiple operating mechanisms. Of the slide-out sections disclosed herein, only the room slide-out 22 spans a sufficiently large distance to require two operating mechanisms.

While the quantity, position, mounting arrangement (such as above or below the stationary vehicle floor) and extension span and rate of each particular operating mechanism 92 can vary depending on the application, each operating mechanism 92 has in common a drive module 94 and a slide module 96. The drive module would at least have a driving unit of some type, and the slide module would have a member that interacts with the drive unit to effect linear movement between the modules, and thereby cause the slide-out section to be extended or retracted relative to the vehicle. Either module can be mounted, using suitable mounting bracketry, to either the slide-out section or a stationary part of the vehicle such that one, but not both, of the modules would travel with the slide-out section as it is extended and retracted.

A preferred operating mechanism, used for example in the slide-out room 24, has a drive module 94 that includes an electric motor 100 with a reducer gear box 102 having a gear train that turns a drive nut 104. The motor 100 and gear box 102 are mounted to a support bracket 106 for glides 108. The slide module 96 includes a support mount 110 having a pair of tracks 112 on each side of a drive screw 114 that has its ends fixed with respect to the support mount 110 so that the drive screw 114 does not rotate. The drive nut 104 and drive screw 114 are preferably threaded with a large pitch ACME thread, suitable for linear transmission.

In the slide-out bedroom 24, the drive module 94 is mounted to the movable floor 62 and the slide module 96 is mounted to the stationary floor 30. Since the drive screw 114 is held against rotation, when the motor 100 drives the drive nut 104 will advance along the drive screw 114 to move the drive module 94 linearly with respect to the slide module 96 as the slide-out room 24 is extended and retracted. The track and glide arrangement, while not always necessary, provides for smooth extension and retraction of the slide-out section.

The tracks 112 each preferably have an angled rail 116 and an inverted v-shaped rail 118 that form a v-shape groove 120 therebetween that opens and narrows toward in the direction of the drive screw 114. The glides 108 then preferably each have a v-shaped valley 122 allowing each glide 108 to mate with the associated track 112 with the valley 122 abutting the rail 118 at one side of the glide 108 and the angled rail 116 extending into the valley 122 at the other side. In this way, the track 112 can effectively capture the glides 108 and limit lateral movement or separation.

The support bracket 106 for the glides 108 essentially spans the gap between the tracks 112, and it can have an inverted u-shape with one or more glides 108 (preferably two) mounted to each upright wall thereof. Moreover, the glides 108 can be rollers (as shown) each having a bearing mounted axle secured to the bracket 106 so that the rollers can be rotated within the tracks 112. Or, the glides 108 can be sliders (not shown) made of low friction and/or lubricious material, such as an ultra high molecular weight (UHMW) polymer, and mounted to the bracket 106 without the ability to turn.

Each slide-out section can be extended or retracted after the vehicle 20 is parked and leveled by activating the motor 110, preferably by an interior wall or dash mounted switch (not shown). The motor 110 will rotate the drive nut 104 so that its internal threads engage the external threads of the drive screw 114. Because the drive screw 114 is held fixed against rotation at will effect a linear force between the two frame modules. This linear force causes the glides 108 to travel along the tracks 112 from one end to the other until the drive is stopped or the slide-out section is fully extended or retracted. In the case of the slide-out in slide-out sections, the secondary slide-out window 28 can be extended (or retracted) consecutively (before or after) or simultaneously with the slide-out room 22 irrespective of its position or direction of extension or retraction.

Figure 10:
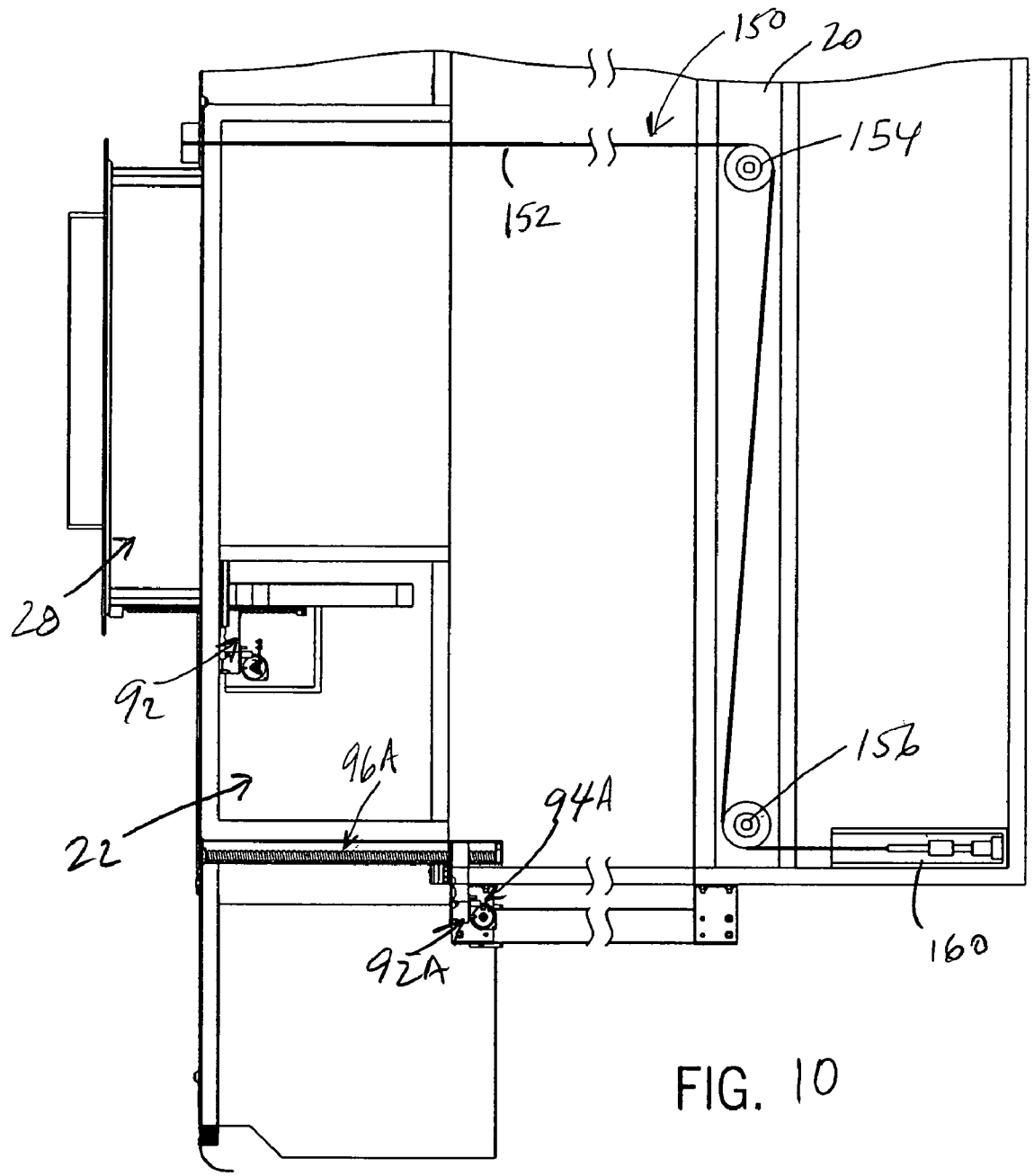
FIG. 10 is a side view of the slide-out room shown in FIG. 4 showing a cable and sheave anti-tip system.

Large slide-out sections, such as the slide-out room 22, can have an anti-tip system to keep the slide-out section level when extended. One such anti-tip system 150, as shown in FIG. 10, has a cable 152 wrapped through upper 154 and lower 156 sheaves, which are mounted to the vehicle 20, with its outer end connected to the end wall 52 of the slide-out room 22 and its inner end connected to its movable floor 54, preferably at a cable tensioner 160. The cable 150 provides a force on the upper and outer part of the slide-out room 22 tending to counter the downward force of gravity on the outer end of the slide-out room 22.

Figure 8:
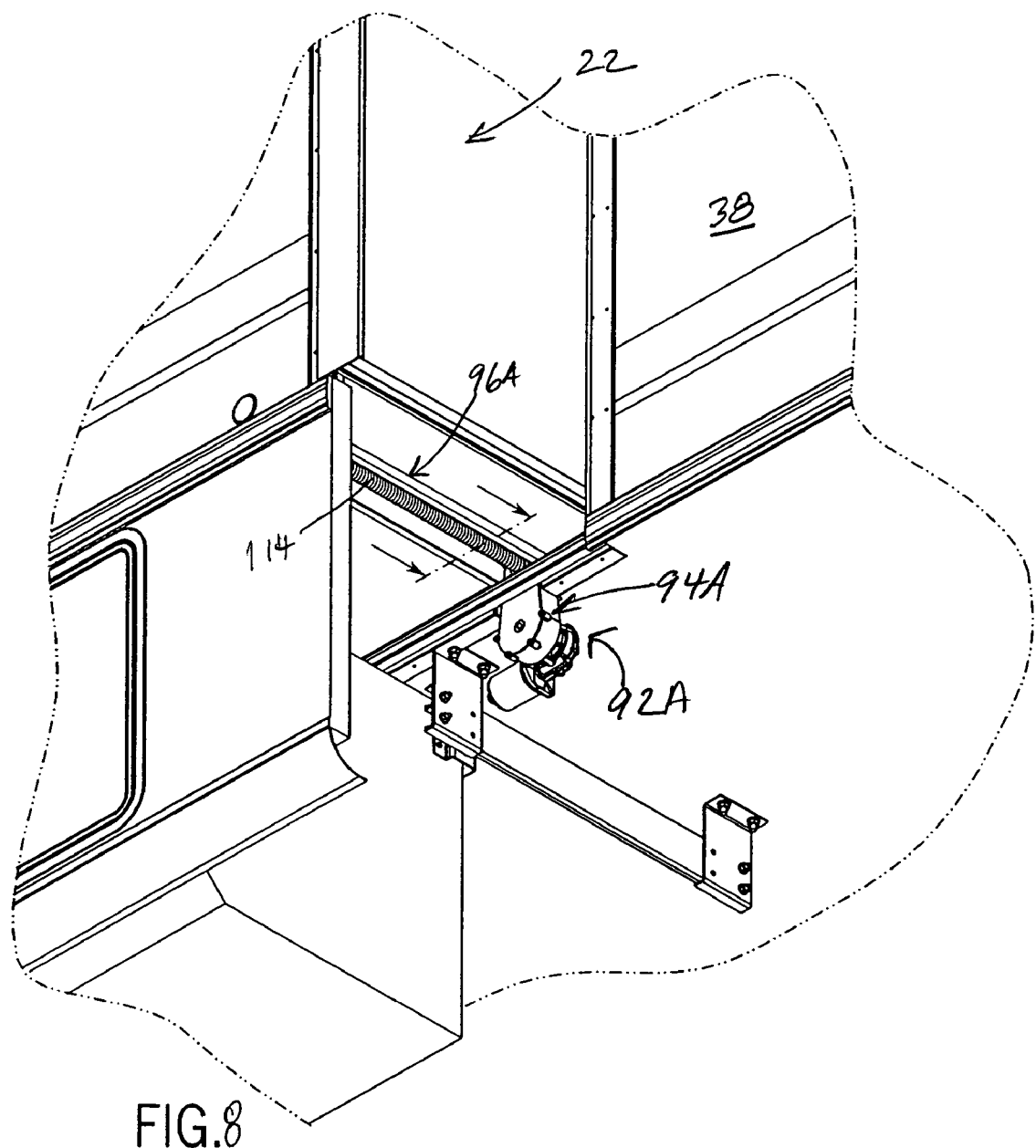
FIG. 8 is a partial bottom perspective view showing an operating mechanism of another slide-out room.
Figure 9:
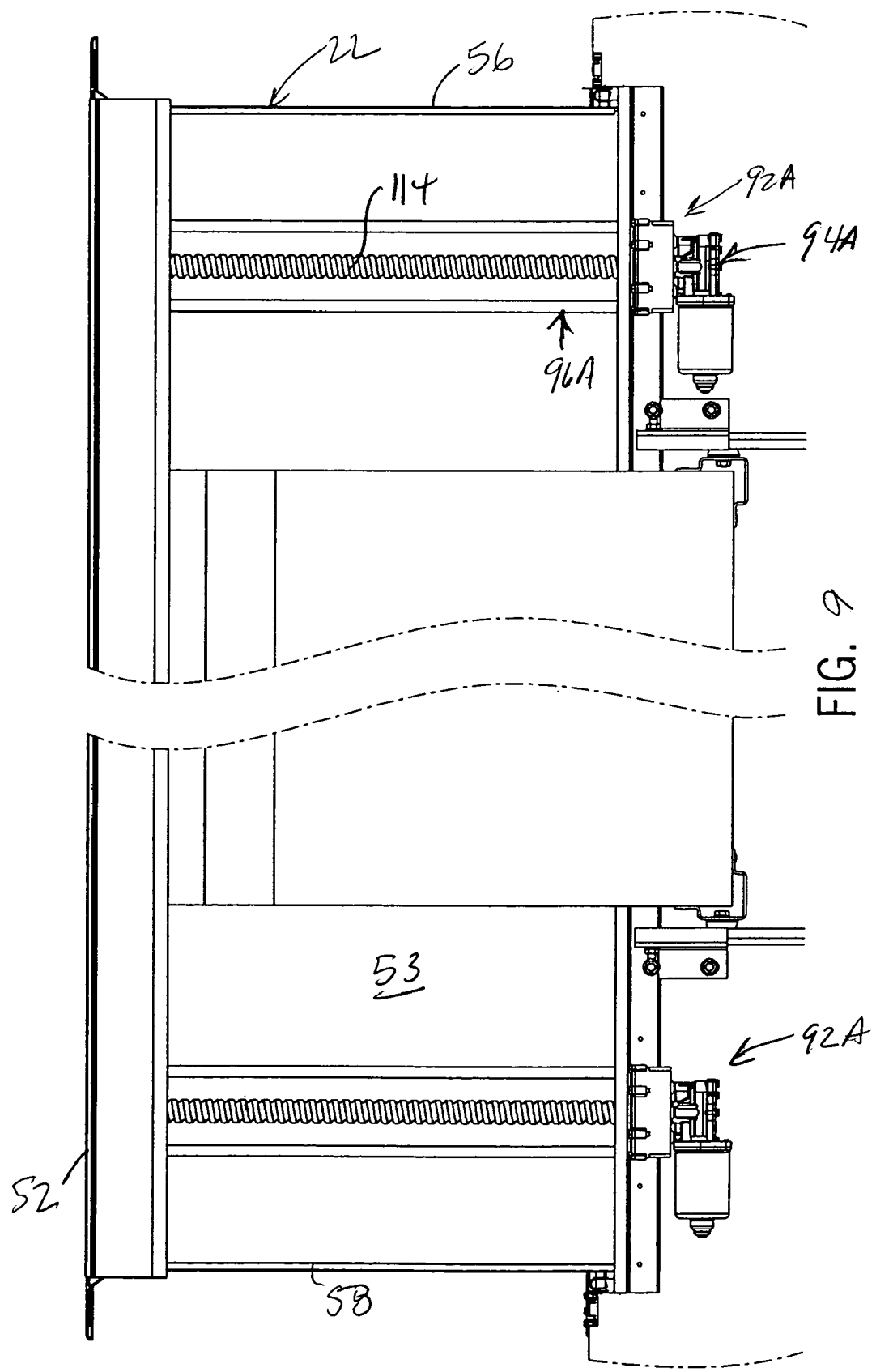
FIG. 9 is a bottom view showing both operating mechanisms of the slide-out room shown in FIG. 4.

The anti-tip system 150 sufficiently supports the weight of the slide-out room 22 such that its operating mechanism 92A does not require the track and glide arrangement to facilitate sliding. In the slide-out room 22, the drive module 94A is mounted fixed to the vehicle and the slide module 96A moves with the slide-out room 22. As shown in FIGS. 8 and 9, the support mount 106A of the slide module 96A simply defines a channel or tunnel for the drive screw 114. Also, since there are no glides, no support bracket is required. A simple motor mount can be used instead, or as shown in the drawings for example, the drive unit can be mounted by clamping an end of the gear box in an opening of the stationary floor of the vehicle to prevent axial movement of the drive relative to the vehicle. If desired, a long, or several short, low-friction contact pads can be mounted at the bearing surface of the vehicle to reduce sliding friction.

Figure 11:
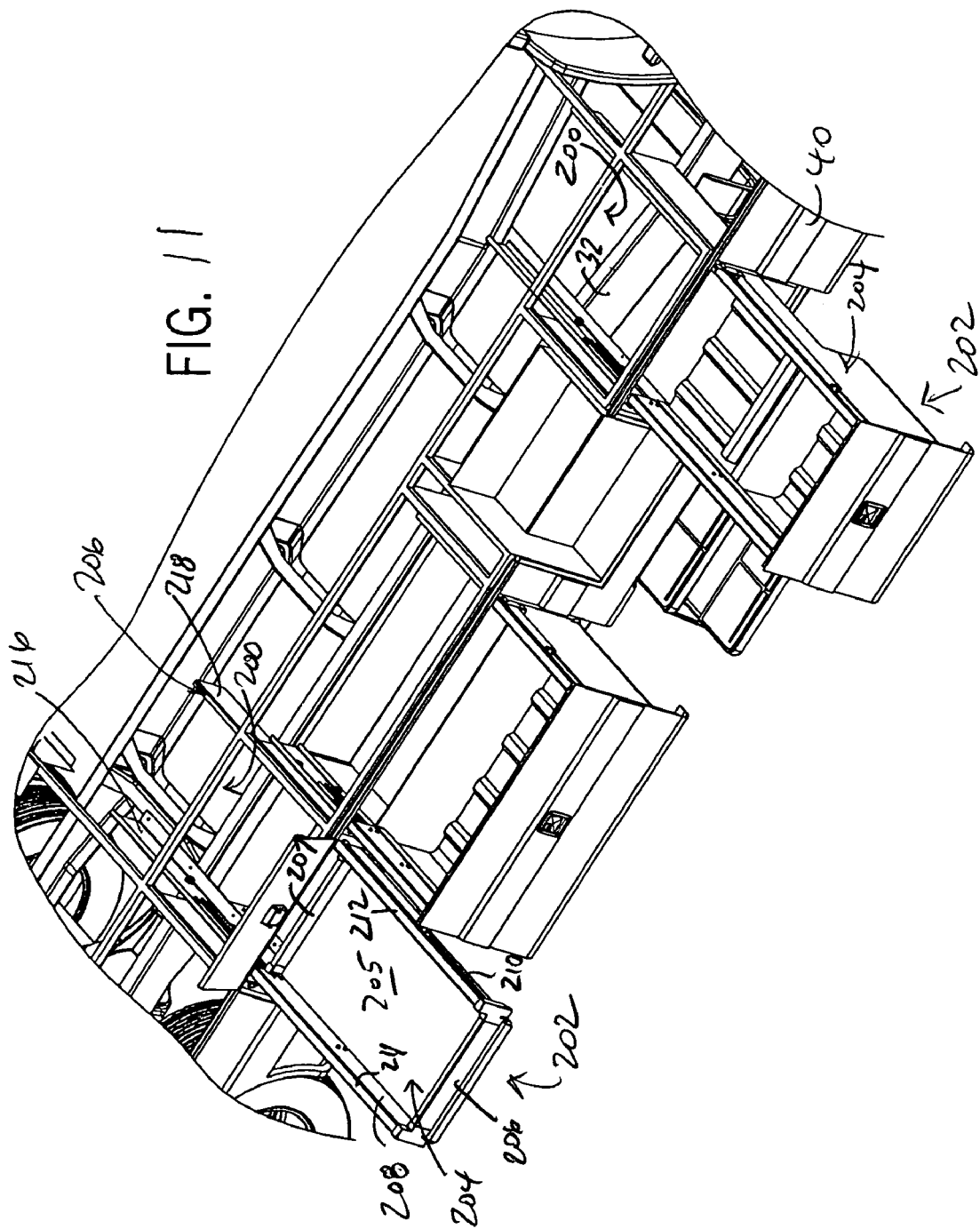
FIG. 11 is a partial perspective view showing cargo slide-outs extended from a side of the vehicle of FIG. 1.
Figure 12:
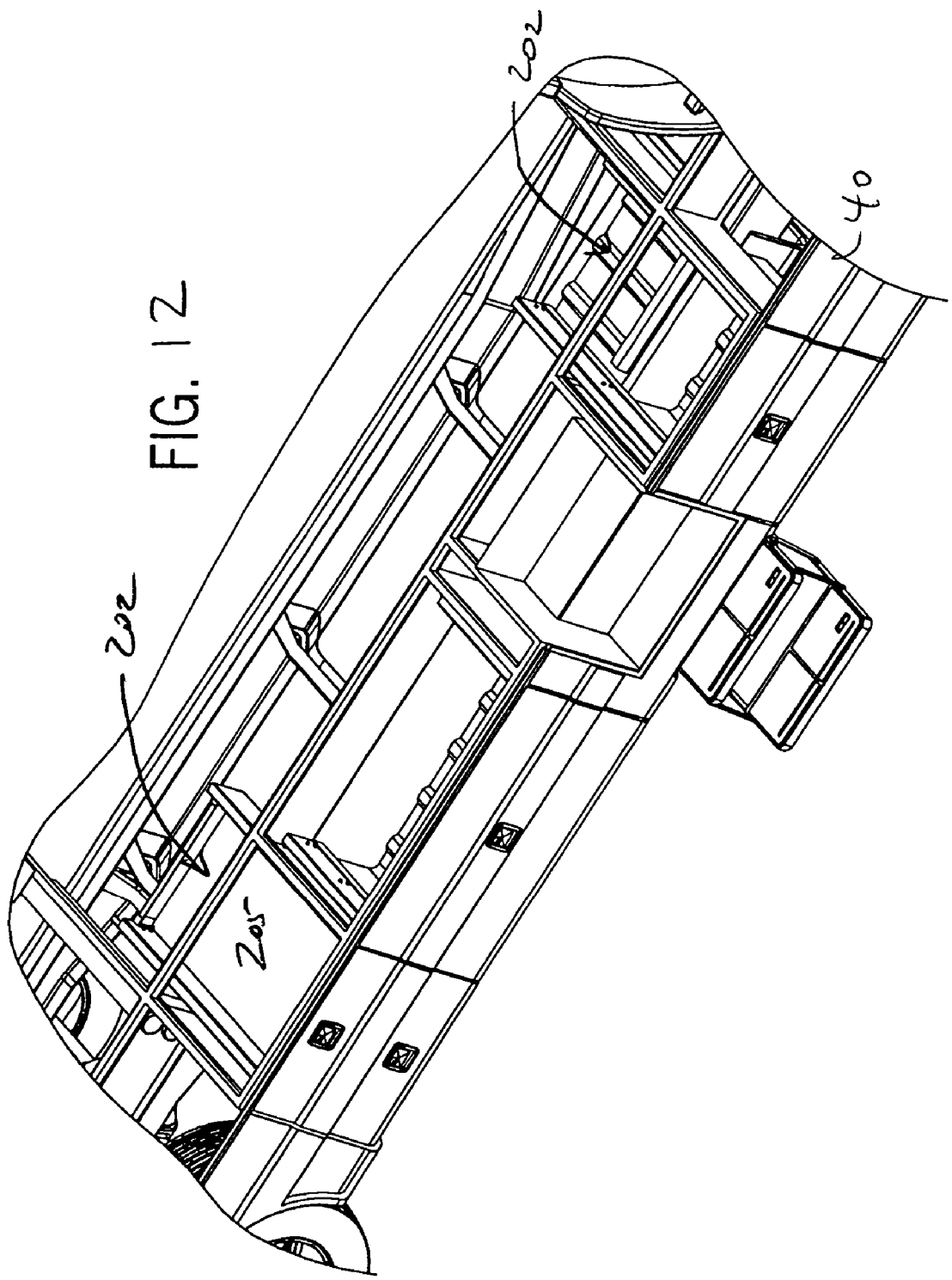
FIG. 12 is a view similar to FIG. 11 showing the cargo slide-outs retracted such that rear compartment extends back into the basement space of the vehicle between a vehicle frame member and the stationary floor of the vehicle.
Figure 13:
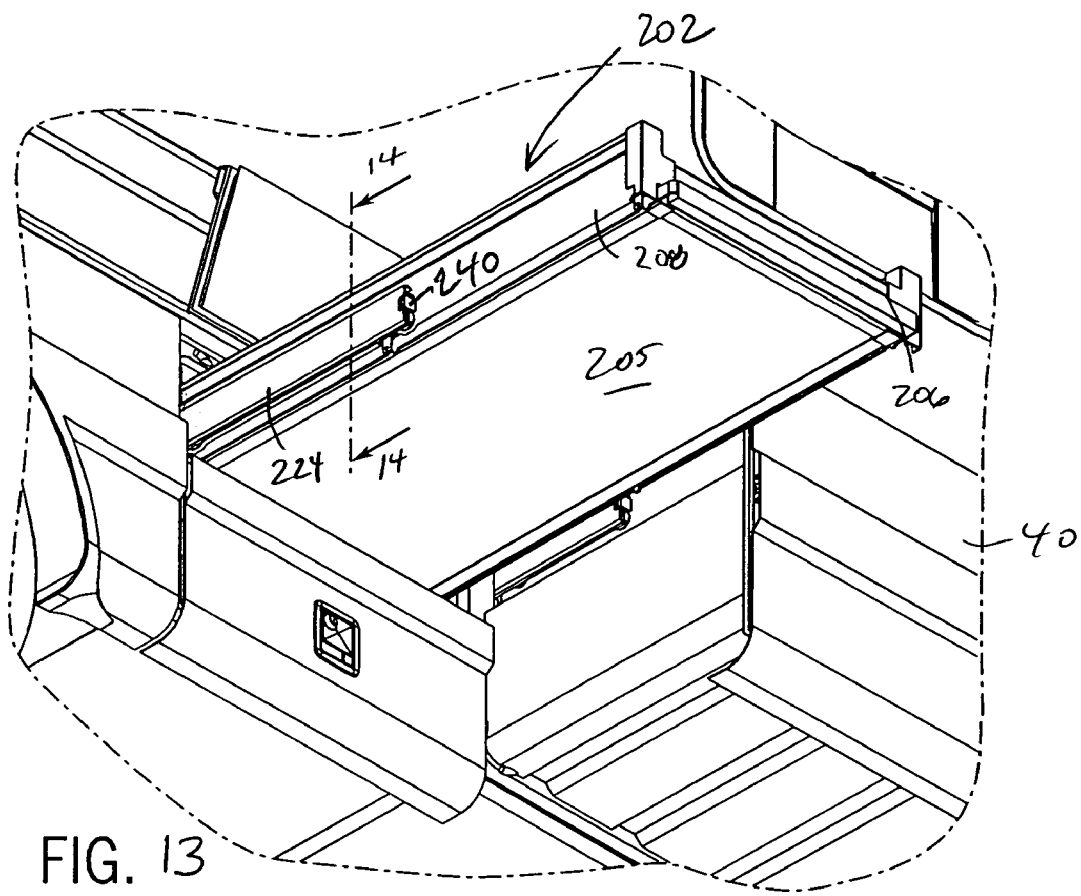
FIG. 13 is a partial bottom perspective view of one of the cargo slide-outs in an extended position.
Figure 14:
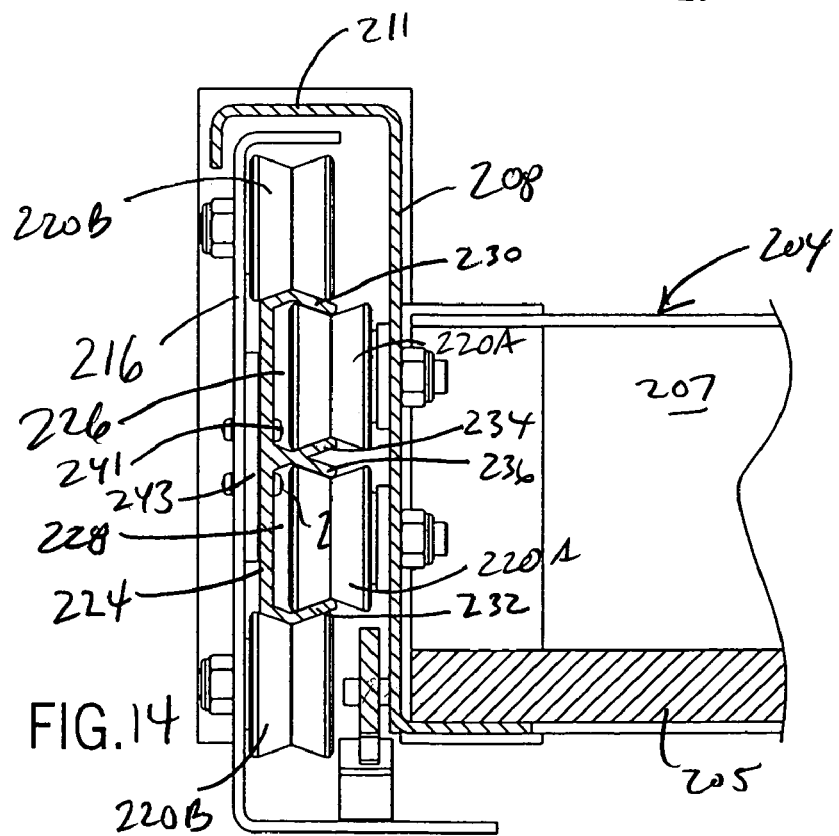
FIG. 14 is a sectional view taken along line 14-14 of FIG. 13 showing a double-run track and glide arrangement used to fully extend a drawer of the cargo slide-out.
Figure 15:
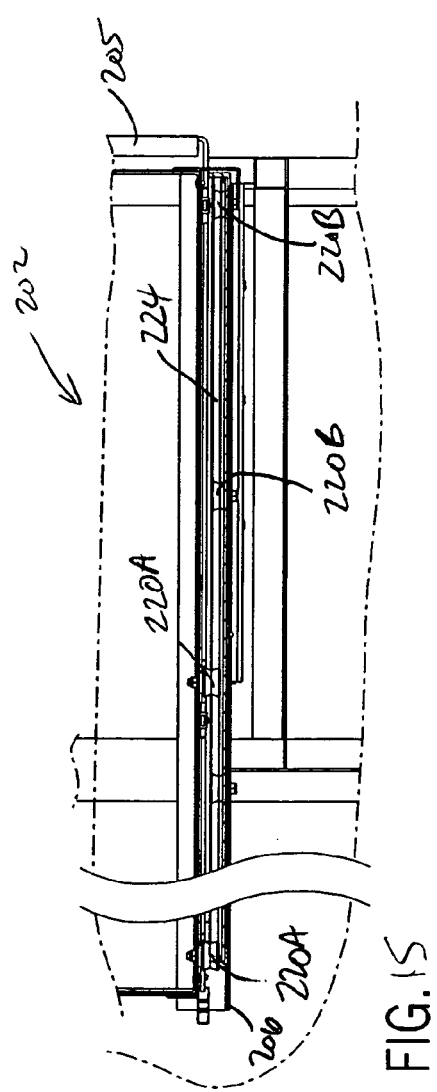
FIG. 15 shows the track and glide arrangement retracted from the top view.
Figure 16:
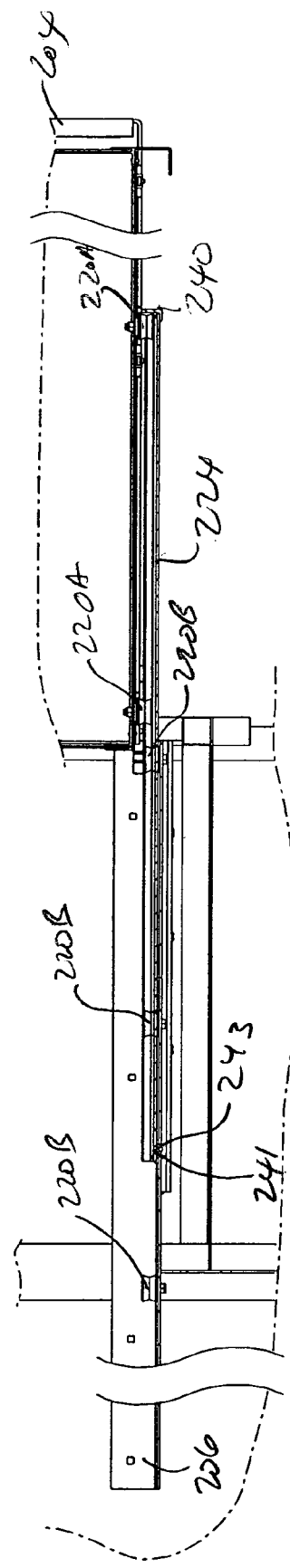
FIG. 16 is a view similar to FIG. 15 albeit showing the track fully extended.
Figure 17:
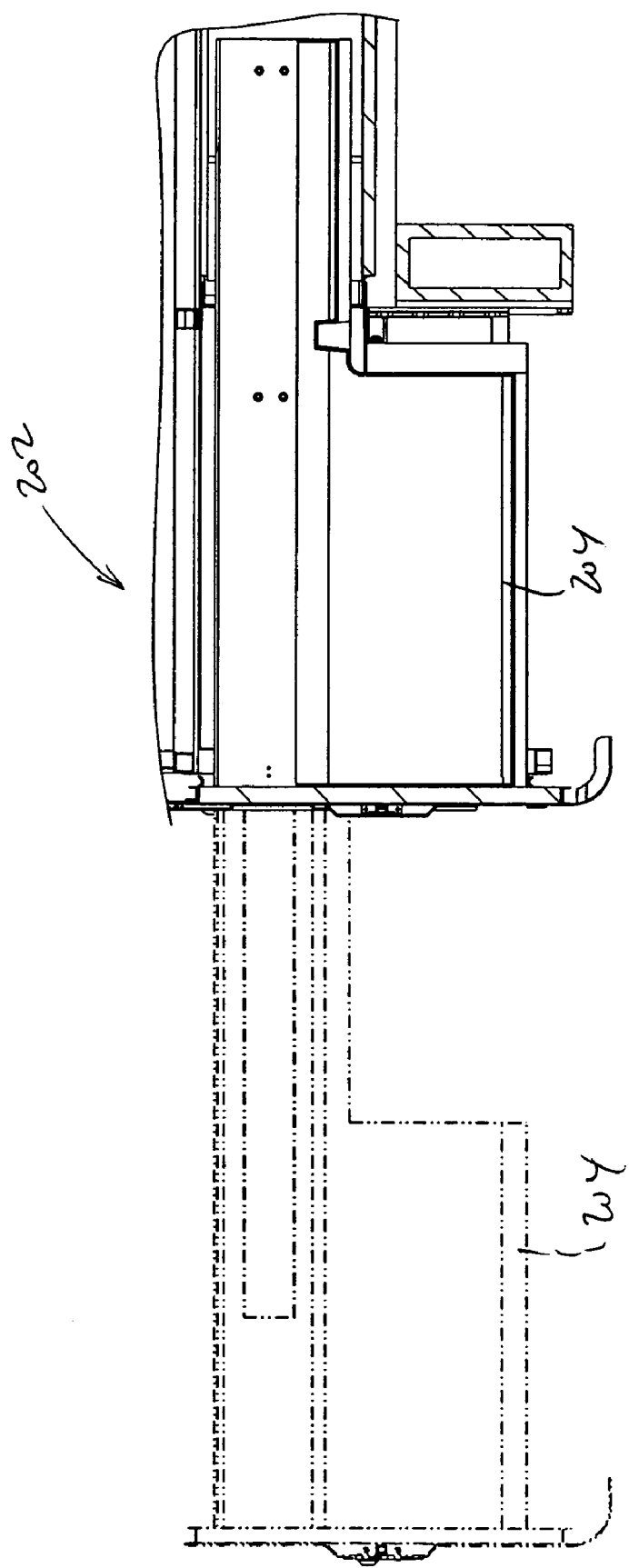
FIG. 17 is a partial sectional view showing another one of the cargo slide-outs, shown fully extended in phantom.

Referring generally to FIGS. 11 and 12, another type of slide-out pertains to increasing the usable space for storing vehicle cargo. The vehicle 20 has several compartments for storing cargo at or near a largely unoccupied basement space 200 in between the long members of the vehicle frame. Because the basement space 200 is at the middle of the vehicle, the compartments that store cargo in this space are necessarily quite long. Without a suitable mechanism for extending the compartments out from the body of the vehicle, the basement space could not be utilized satisfactorily since the rear of such compartments would be inaccessible. Thus, the present invention provides small scale cargo slide-outs 202 that extend from the body of the vehicle so that the cargo can be loaded and accessed readily.

The configuration of the cargo slide-out compartment can vary. Two exemplary embodiments are shown in the drawings, including a split configuration in which the cargo slide-out has a long shallow drawer box, which is mounted in the upper portion of a double height compartment above a shallow and shorter drawer, and a stepped configuration in which the cargo slide-out has a deep front drawer box part and a long shallow part, which extends into the basement space 200. Despite the various configurations of the drawer, each has a drawer 204 and a double-run track and glide arrangement is common. As such, for simplicity only one such arrangement will be described in detail.

Referring to FIGS. 11-17, the cargo slide-out 202 has a drawer 204 with a bottom 205, upright ends 206 and 207 and upright sides 208 and 210 (with respective flanges 211 and 212) defining a storage area of a particular configuration. The drawer 204 extends and retracts from the vehicle body in a guide frame 206 having sides 216 and 218, preferably of c-shaped cross-section, generally adjacent, in parallel to and to the outside of, the sides 208 and 210 of the drawer 204 that provides upper bearing surfaces for the respective flanges 211 and 212.

Glides 220A are mounted to the drawer sides 208 and 210 and glides 220B are mounted to the walls 216 and 218 of the guide frame 206. The drawer mounted glides 220A extend outward toward the walls 216 and 217 of the guide frame 206, and the guide frame mounted glides 220B extend toward the associated drawer side walls 208 and 210. The glides 220A and 220B are preferably mounted at each side of the drawer to be in two vertically spaced horizontal rows, with at least one, and preferably two or three, glides in each row. The drawer mounted glides 220A at each side of the drawer are preferably vertically aligned across the two rows with two glides near the back corner of the drawer and two near the middle. The guide frame mounted glides 220B at each side are vertically staggered across the rows back from at least one at the front end of the guide frame 206. The two rows of drawer mounted guides 220A are preferably vertically between the two rows of guide frame mounted guides 220B.

Here again, the glides 220A and 200B can be rollers (as shown) each having a bearing mounted axle secured to either the drawer of the guide frame so that the rollers can rotated, or they can be non-rotating sliders (not shown) made of low friction and/or lubricious material, such as an ultra high molecular weight (UHMW) polymer. Again, the glides 220A and 220B preferably each have a v-shaped valley.

The glides 220A and 220B are sized and aligned to engage and ride along a double-run track 224 at each side of the drawer. The track 224 can take various forms, but must have at least one rail for the drawer mounted glides 220A to ride on and at least one for the guide frame mounted glides 220B to ride on. For example, the track can have two rails or grooves for each of the sets of glides, or it can have a groove receiving the drawer mounted glides and a rail made of an outer edge surface of the track for the guide frame mounted glides.

In the preferred embodiment shown in the drawings, each track 224 is an extruded aluminum piece having a generally E-shaped cross-section. The track 224 defines a pair of long grooves 226 and 228 between two long rails 230 and 232, both of which preferably have a "V" (or inverted "V") configuration. The grooves 226 and 228 open to the same side of the track 224 such that both receive and capture the drawer mounted glides 220A. The guide frame mounted glides 220B ride along the outer surfaces of the rails 230 and 232.

As mentioned, the grooves 226 and 228 and rails 230 and 232 of each track 224 are preferably v-shaped. That is, the outer rails 230 and 232, corresponding to the upper and lower legs of the "E" are bent to define either a "V" or inverted "V" shape, preferably the upper rail 230 is an inverted "V" and the lower rail 232 is an upright "V". The middle leg of the "E" then forks at two angled rails 234 and 236 which angle toward the respective outer rails 230 and 232 such that two sideways v-shaped grooves are defined. Thus, the drawer mounted glides 220A engage the grooves 226 and 228 such that the ends of the rails 230 and 232 and the angled rails 234 and 236 extend into the valleys to capture the glides. The valleys of the guide frame mounted glides 220B ride along the v-shaped rails 230 and 232. When the tracks 224 are engaged with the glides 220A and 220B, they connect the drawer 204 to the guide frame 206, with the "V" configuration giving the drawer a solid connection with very little lateral play.

The tracks 224 slide with respect to both the drawer 204 and the guide frame 206. The sliding of the tracks 224 is limited by front 240 and back 241 stop members mounted to respective front and back ends of each track 224. Each of the front stops 240 will abut the front two glides 220A of the drawer when the drawer 204 is fully extended to prevent it from separating from the track 224. Each front stop 240 will also be pushed by the drawer front to move each track 224 inward until engaging the front end of the guide frame 206, which prevent the track 224 from moving too far backward. The back stops 241 will engage catch members 243 mounted to the guide frame 206 at each side of the drawer 204 to prevent the tracks 224 and drawer 204 from sliding too far forward and separating from the guide frame 206. The stops 240 and 241 thus work to keep the drawer 204 mounted to the guide frame 206.

The cargo slide-out 202 allows full extension of the drawer 204 such that the back end of the drawer 204 can be brought to the front end of the guide frame 206. The cargo slide-out 202 can be moved from the retracted position shown in FIGS. 12 and 15, by pulling on the front of the drawer 204. This causes the glides 220A and 220B to roll or slide along the tracks 224 and the tracks 224 to slide forward as needed depending on how much of the drawer 204 is to be accessed.

The relatively small size of the cargo slide-outs 202 allows them to be secured in the retracted position with a simple latching lock mechanism, such as on the hinged door shown. However, this is not the case for the large room sized slide-outs. To secure these against movement or extension during transit, and to effect a proper seal with the vehicle exterior, a more robust travel lock must be used. Two improved travel locks are shown in the drawings, specifically, FIGS. 18-23 show a compound motion travel lock in automated 300A and manual 300B versions, and FIGS. 24-27 show a manual clamp type travel lock 400.

Referring now to FIGS. 18-22, an automated travel lock 300A includes a powered drive unit 302, preferably an electric motor, that turns a gear or gear arrangement 304 that meshes with and drives one end of a drive screw 306, preferably having large pitch ACME threads suited for linear transmission. The opposite end of the drive screw 306 extends into a cylindrical push rod 308. A nut 309 is connected to the push rod 308 so that the drive screw 306 rotates relative to the push rod 308, which does not rotate but moves linearly back and forth in response to rotation of the drive screw 306. A T-shaped end 307 is mounted to the free end of the push rod 308 and is coupled to a lock arm 310, which is movable within a guide frame 312.

The lock arm 310 forms a 90 degree bend with two somewhat L-shaped spines 316. At the ends of the short legs of the spines 316 is a pressure pad 320 providing a planar contact surface when the travel lock is engaged. Each of the long legs of the spines 316 have two vertical openings in which fit one long 321 and two short 322 cam pins. The long cam pin 321 extends through the T-shaped end 307 of the push rod 308 and two associated openings in the spines 316 and into two linear cam slots 324 in each of the top and bottom walls of the guide frame 312. The two shorter cam pins 322 extend from the other two openings in the spines 316 and into arcuate cam slots 326 (sweeping 90 degrees) in the guide frame 312.

The entire assembly fits into a housing 330 which fits into a pocket 314 in one. of the upright walls at the side of one of the slide-out sections near the exterior end wall thereof. Depending on the thickness of the wall, the housing 300 may or may not protrude into the interior for the slide-out section. A trim plate 332 fits within the opening in the exterior side of the slide-out wall.

Figure 18:
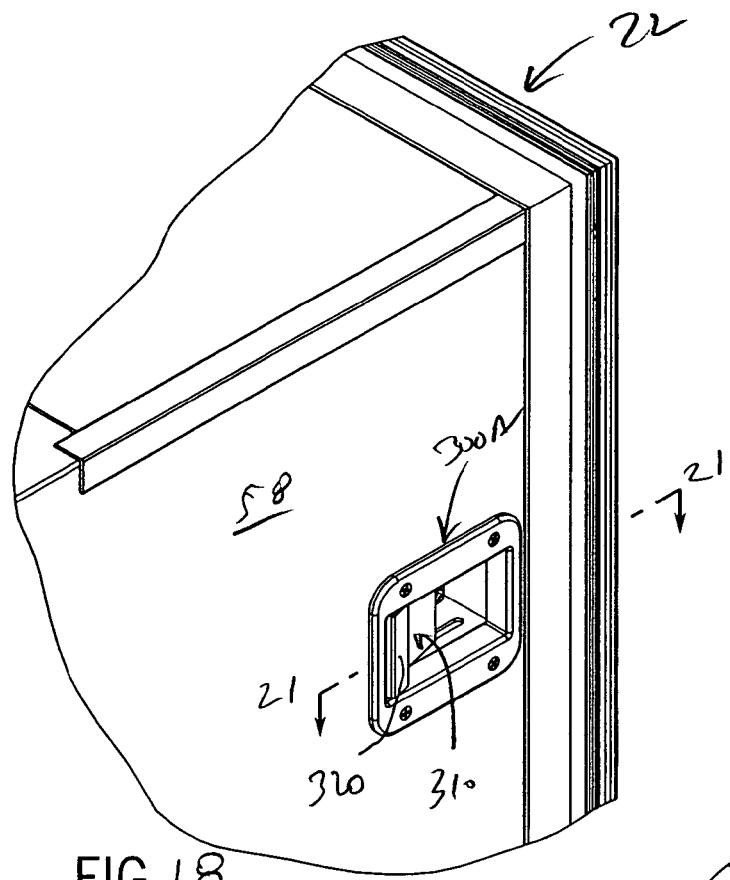
FIG. 18 is a partial exterior perspective view of one of the slide-out sections showing a travel lock in a retracted position.
Figure 19:
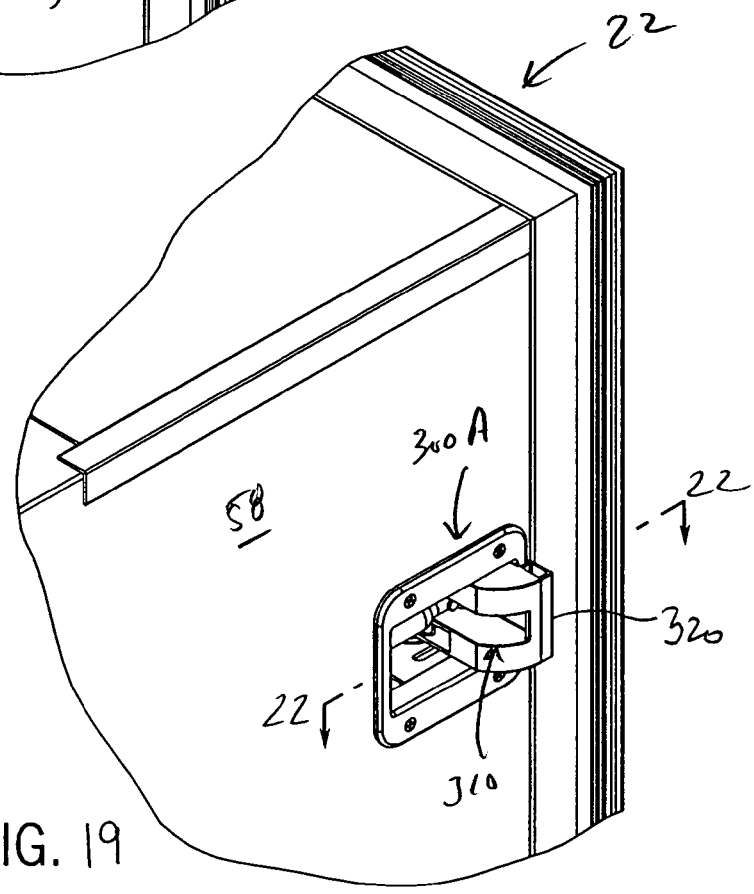
FIG. 19 is a view similar to FIG. 18 showing the travel lock in an engaged position.
Figure 20:
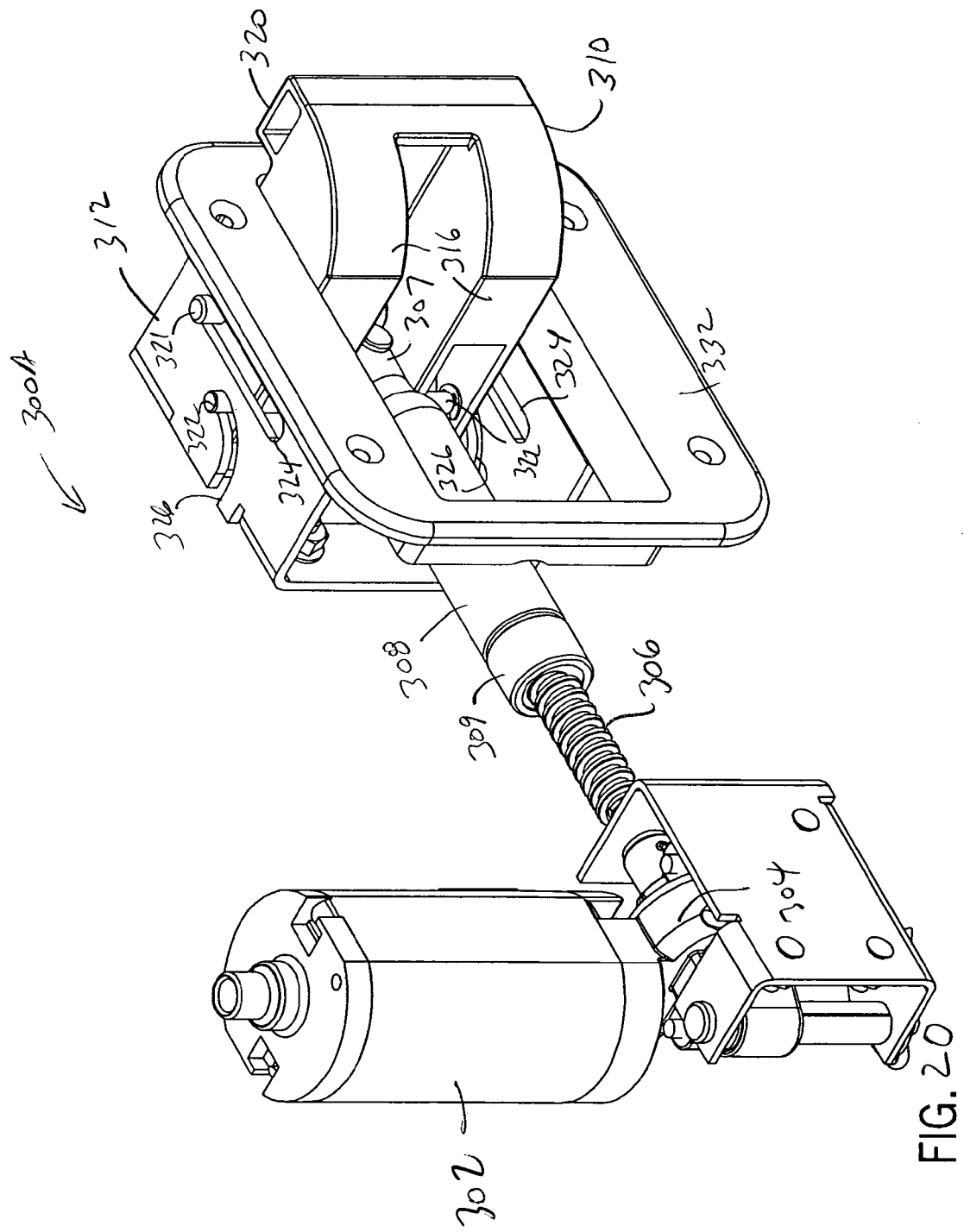
FIG. 20 is a perspective view showing the travel lock of FIG. 18 in isolation.

When the lock arm 310 is retracted, as shown in FIGS. 18 and 21, the planar surface of the pressure pad 320 will be essentially flush with or slightly recessed into the slide-out wall. Thus, when the lock arm 310 is retracted, it will not interfere with extension and retraction of the slide-out section. By energizing the drive, preferably by an interior wall or dash mounted switch, the drive screw 306 will turn and cause the push rod 308 to drive the lock arm 310 by engagement with the cam pin 321. The cam pins 322 are guided by the cam slots 326 to swing the lock arm 310 out about 90 degrees from the slide-out wall to an intermediate extended (but not yet fully engaged) position. Further linear driving by the drive screw 306 will cause the lock arm 310 to move linearly, until the cam pin 321 reaches the end of the straight cam slots 324, from the intermediate extended position into the engaged position shown in FIGS. 19 and 22, in which the lock arm 310 engages an inner surface of the exterior side wall of the vehicle. This linear movement allows the lock arm 310 to clamp tightly against the exterior vehicle side wall so as to limit play between the slide-out section and the vehicle and to create a tight, water-proof seal at the slide-out flange. The engagement of the ACME threads with the drive will resist inadvertent movement of the lock arm and effectively lock the slide-out section.

Figure 23:
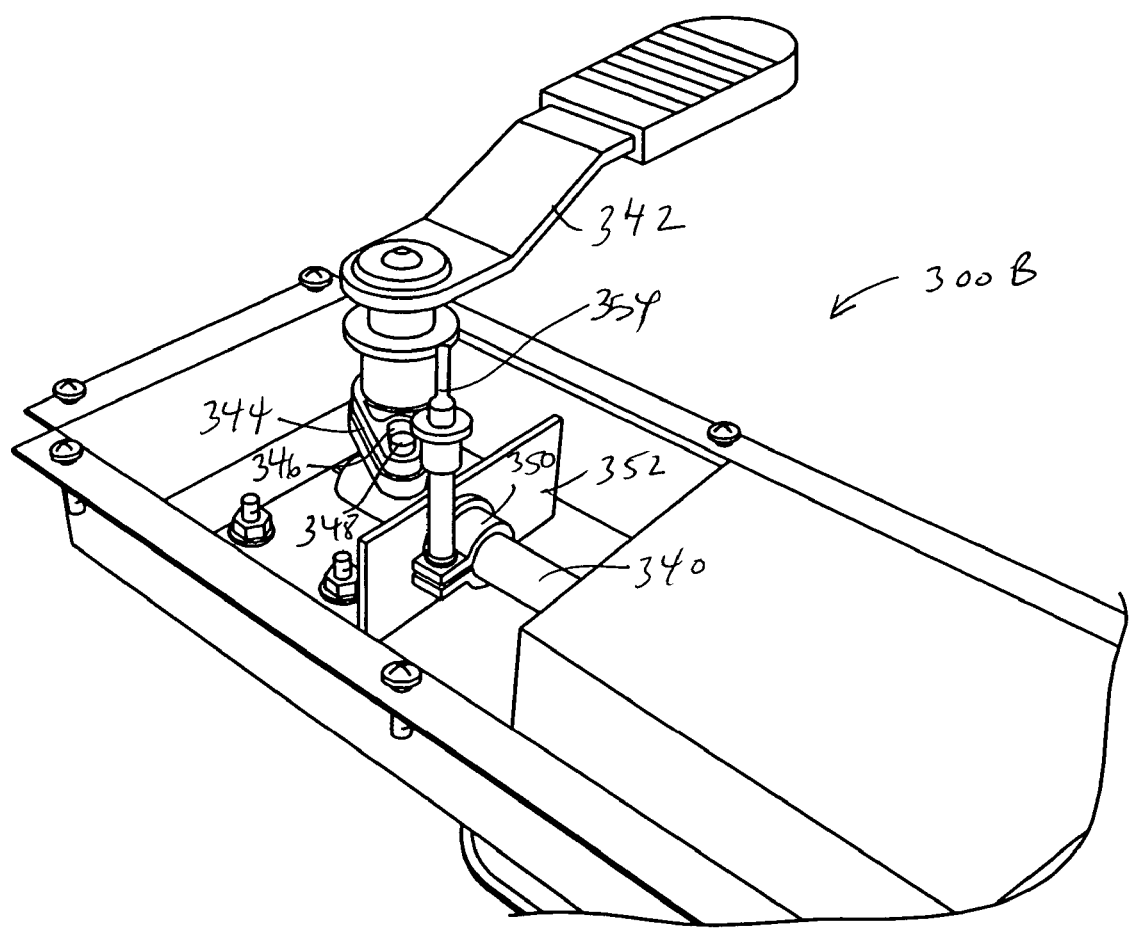
FIG. 23 is a partial perspective viewing showing a manual version of the travel lock of FIG. 18.
Figure 24:
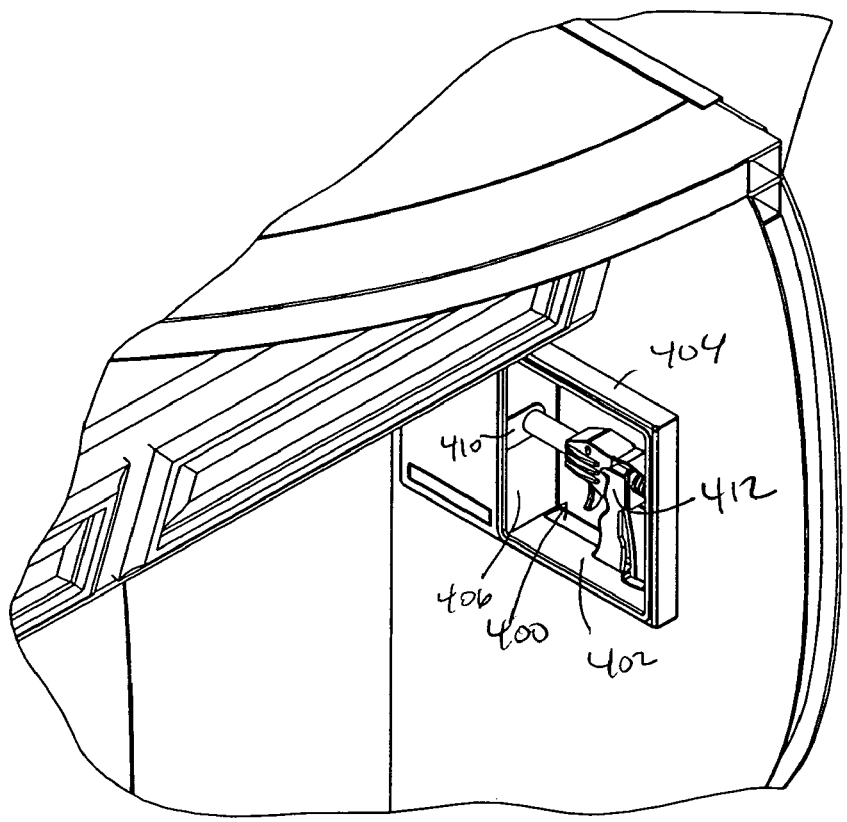
FIG. 24 is a partial interior perspective view showing the actuator end of an alternate, clamp type travel lock in a stowed position.
Figure 25:
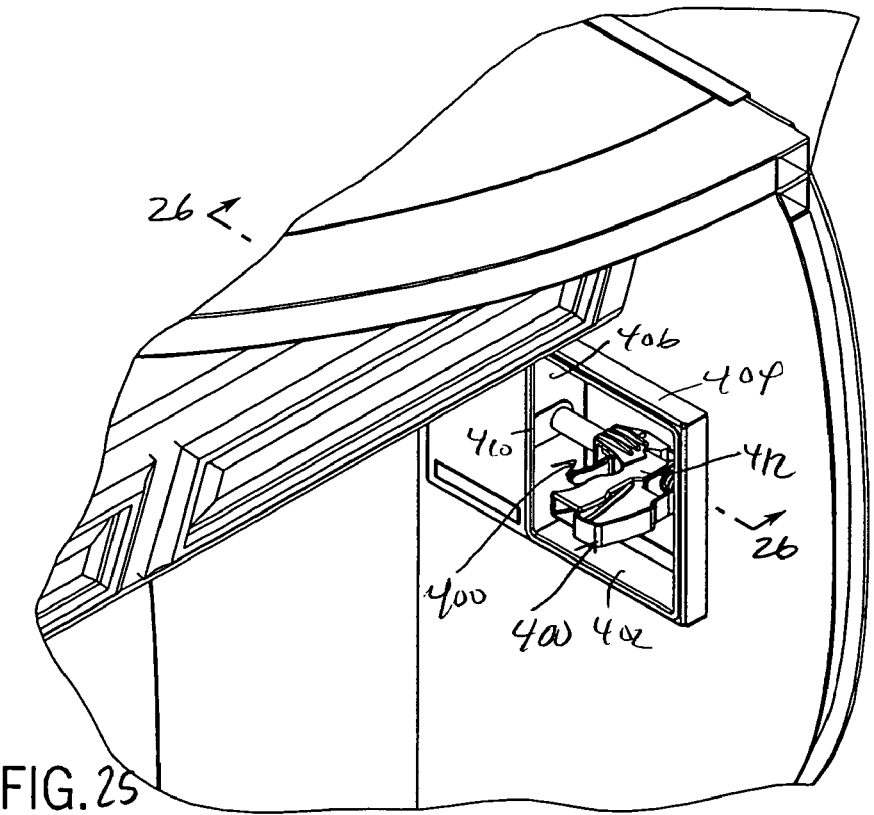
FIG. 25 is a partial interior perspective view similar to FIG. 24 showing the actuator end of the travel lock pivoted out for deploying the travel lock.
Figure 26:
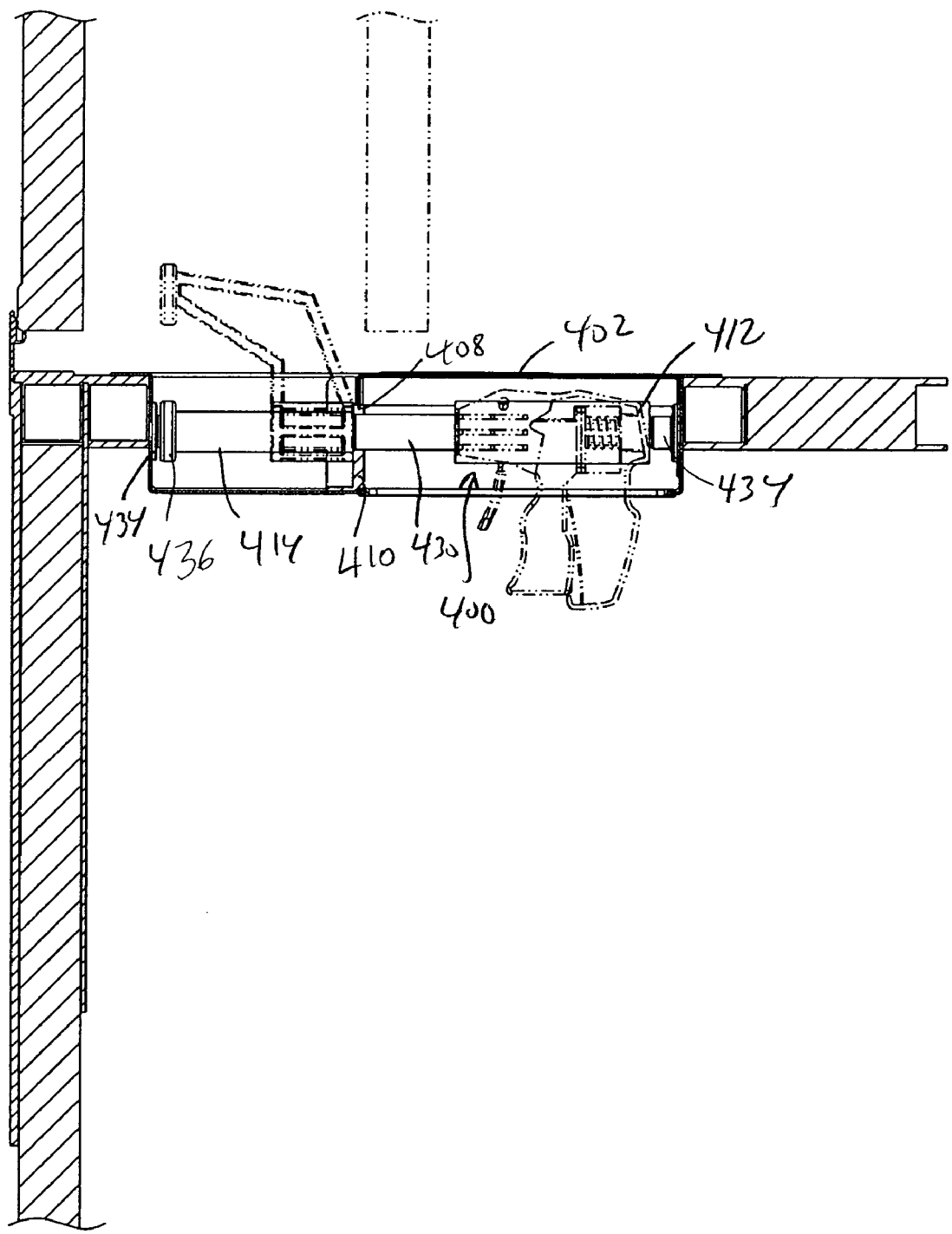
FIG. 26 is a partial sectional view taken along line 26-26 of FIG. 25 and showing in phantom the actuator and lock arm of the travel lock pivoted.
Figure 27:
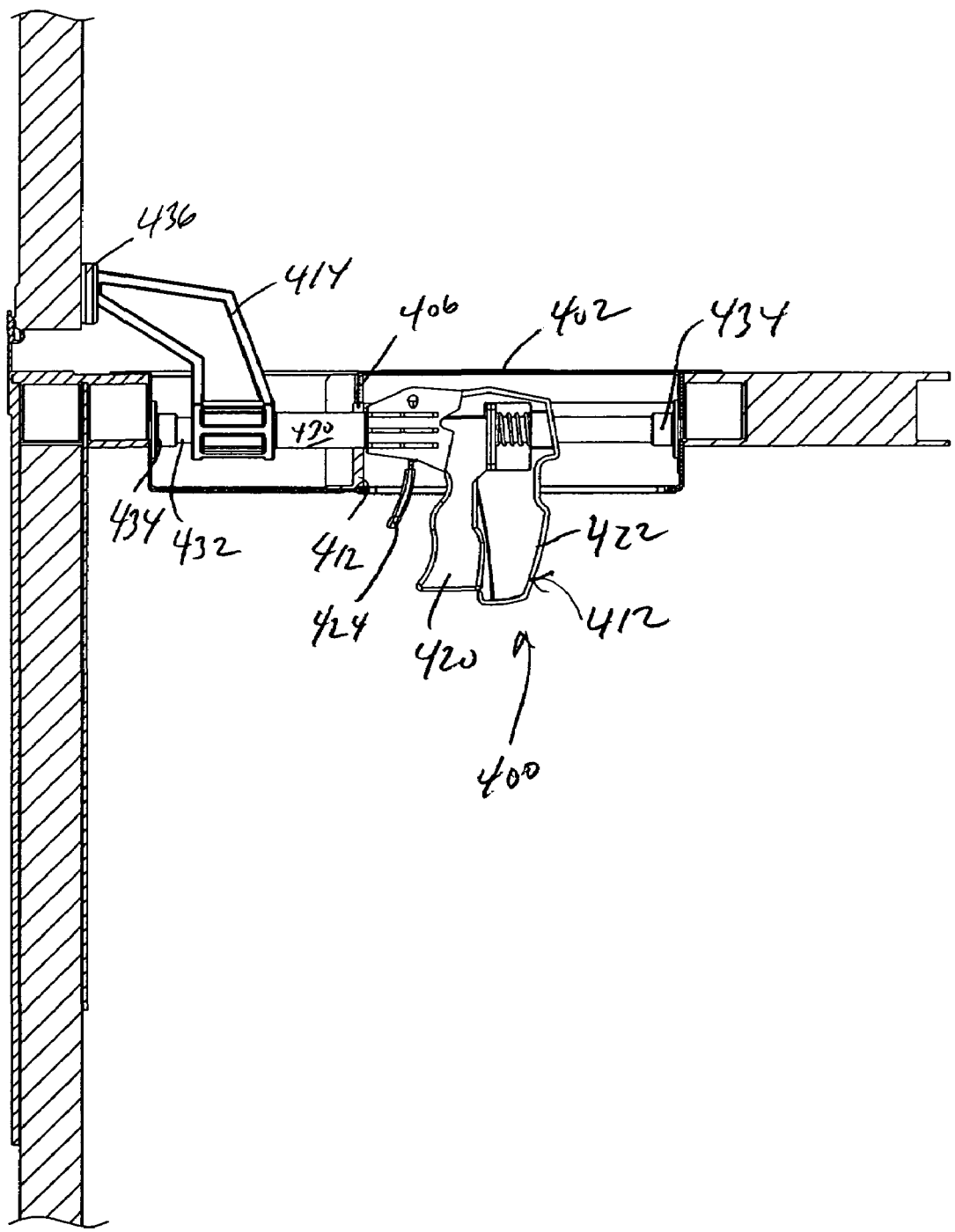
FIG. 27 is a view similar to FIG. 26 showing the travel lock in the engaged position.

FIG. 23 shows the manual version 300B of this travel lock. This version has the same type of lock arm and cam pin and slot arrangement, however, rather then actuating the lock arm with a motor driven drive screw, the lock arm is driven by a plunger 340 that moves linearly back and forth by rotation of a crank handle 342 turning a cam lever 344 with a slot 346 that captures a radial projection 348 extending from the plunger 340.

The manual version 300B fits into the same space in the slide-out wall, however, its housing may be smaller since there is no motor, such that preferably only the short stub or axle to which the crank handle mounts 342 will project though the wall into the interior of the slide-out section. The crank handle 342 is preferably removable so that it can be stored discreetly when not used.

To actuate the lock arm, the crank handle 342 is rotated only about 180 degrees. The lock arm will follow a similar compound (pivotal and linear) movement as in the automated version, so as to tightly clamp against an inner surface of the exterior vehicle side wall. To secure the travel lock in the engaged position, a band clamp 350 can be mounted about the plunger 340 so as to abut a bracket 352 through which the plunger 340 extends and thus prevent linear movement thereof which would otherwise allow the lock arm to move toward its retracted position. The band clamp 350 is preferably tightened and loosened by a small thumbscrew 354 which extends into the slide-out interior.

The manual clamp type travel lock 400 is shown in FIGS. 24-27. The travel lock 400 fits into a housing 402 in a pocket in the slide-out side wall, and the housing 402 and trim plates 404 define openings at both the exterior and the interior of the slide-out section. The housing 402 also defines a partition 406 between the interior and exterior openings. The travel lock 400 fits into the housing 402 and pivotally mounts under tension between opposite walls of the housing 402 with a middle part of the travel lock 400 extending though a slot 408 in the partition 406 which is closed by a keeper member 410. An actuator 412 of the travel lock 400 is disposed at the interior opening and a lock arm 414 is disposed at the exterior opening.

The actuator 412 preferably is a ratchet drive mechanism of a known construction. The ratchet action is controlled by a trigger 420 mounted to pivot adjacent a pistol grip handle 422. A trigger-like release lever 424 can be used to disengage the ratchet drive.

The actuator 412 also has a pusher sleeve 430 mounted about an elongated support bar 432, which extends the length of the travel lock 400 and has end caps 434 that abut the opposite walls of the housing 402. The end of the sleeve 430 mounts, either integrally or as a separate part, the lock arm 414. The lock arm 414 is bent so as to be offset from the support bar 432 and to have a leg that extends essentially parallel thereto. The end of the lock arm 414 has a small disc-shaped pressure pad 436 with a flat planar surface used to abut the vehicle wall.

In use, the entire travel lock 400 is pivoted with respect to the housing 402 about the support bar 432 so that the actuator handle 422 extends toward the interior of the slide-out section and so that the lock arm 414 is disposed outside of the slide-out wall such that the pressure pad 436 can be brought into abutment with an inner surface of the exterior vehicle side wall. Then, the trigger 420 is depressed repeatedly as needed to incrementally advance the actuator 412, sleeve 430 and lock arm 414 along the support bar 432 so that the lock arm 414 engages and clamps against the vehicle to hold and seal the slide-out with respect to the vehicle. Depressing the release lever 424 disengages the ratchet drive and allows the lock arm 414 to be disengaged from the vehicle by pulling the actuator 412 and sleeve 430 (from inside the slide-out section) back.

For any of the travel stops described above it may be useful to include an electronic interrupt circuit in the drive circuitry of the power slide-out drive system which can prevent movement of a slide-out section until the travel lock has been disengaged. Such a circuit could also prevent the slide-out section from being retracted in the event the travel stop was inadvertently in the engaged position. A suitable switch could be used to detect the position of the lock arm, or a current limiter sensing motor loading can be used.

In addition to the slide-out features of the present invention, another way to maximize the interior space in vehicles of this type is to employ space-saving appliances. A video display, such as a television or computer monitor, is one common appliance in recreational vehicles. Technological advancements in video reproduction have given rise to flat panel displays, such as plasma and LCD displays. Such flat panel displays can produce a large image with a very shallow depth, usually 5 inches or less, such that they have a very small footprint and can be hung on a wall. Flat panel displays are thus ideal for use in recreational vehicles. However, given the very limited available interior space of such vehicles, without special mounting, even flat panel displays can be too intrusive or interfere with the movement of a slide-out section. Thus, the present invention provides a lift mount 500 for a video display, as shown in FIGS. 28-33, and an articulating wall mount 600, as shown in FIGS. 34-37.

Figure 28:
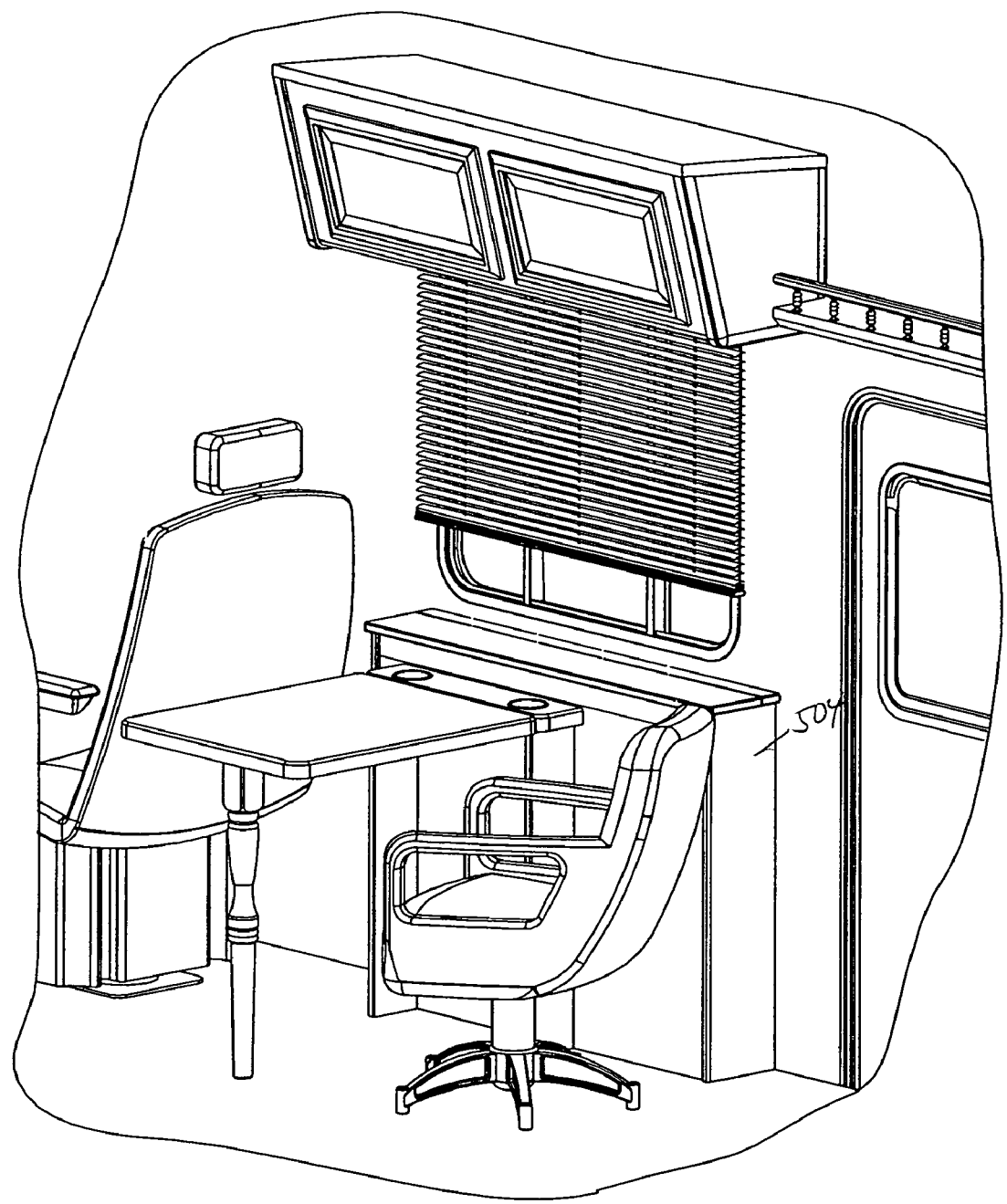
FIG. 28 is a partial interior perspective view showing a dinette table with an end piece containing a stowed video display and lift mount.
Figure 29:
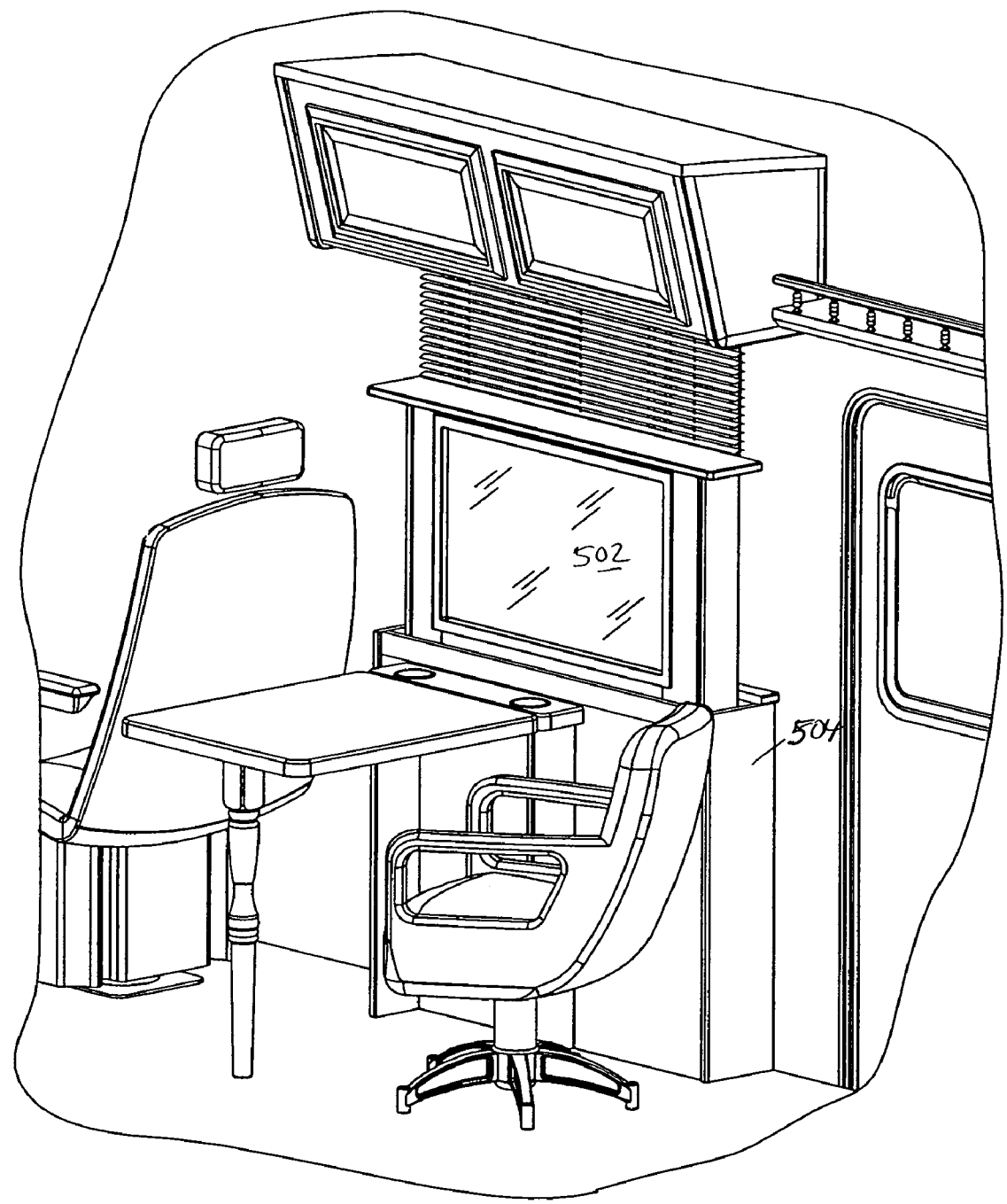
FIG. 29 is a view similar to FIG. 28 albeit showing the display elevated position.
Figure 30:
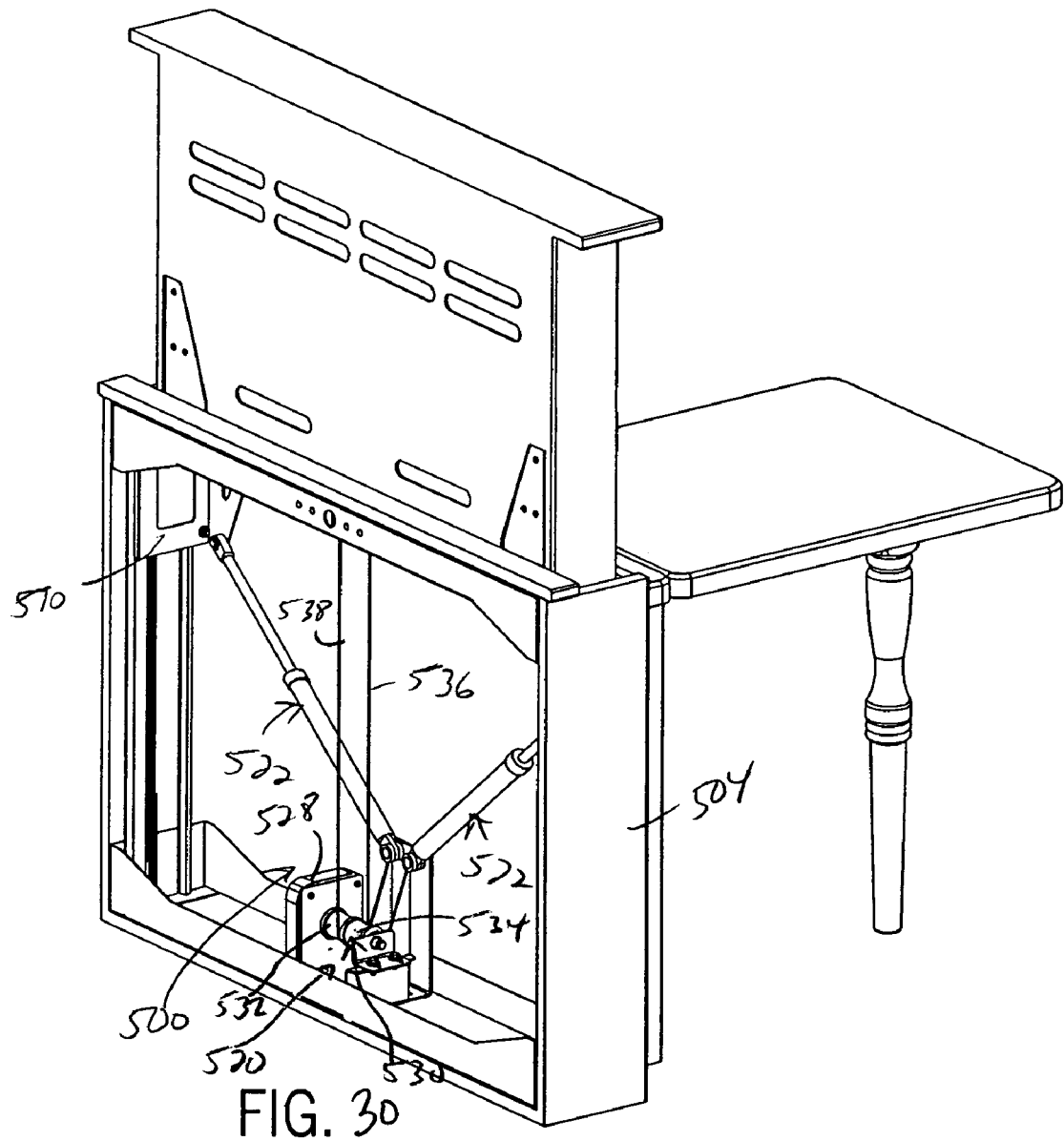
FIG. 30 is a rear perspective view showing the lift mount with the display elevated.
Figure 33:
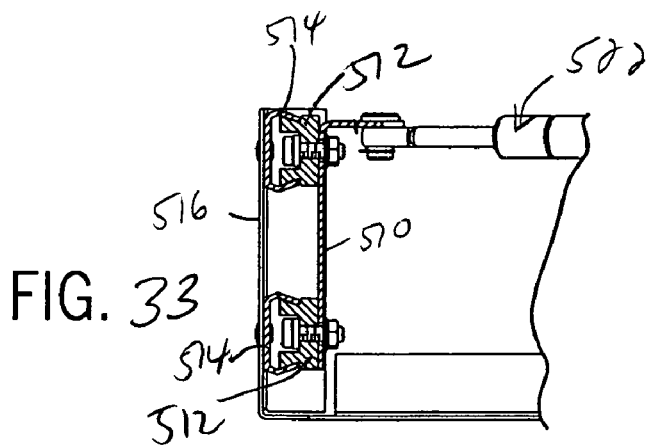
FIG. 33 is a partial sectional view taken along line 33-33 of FIG. 31.
Figure 34:
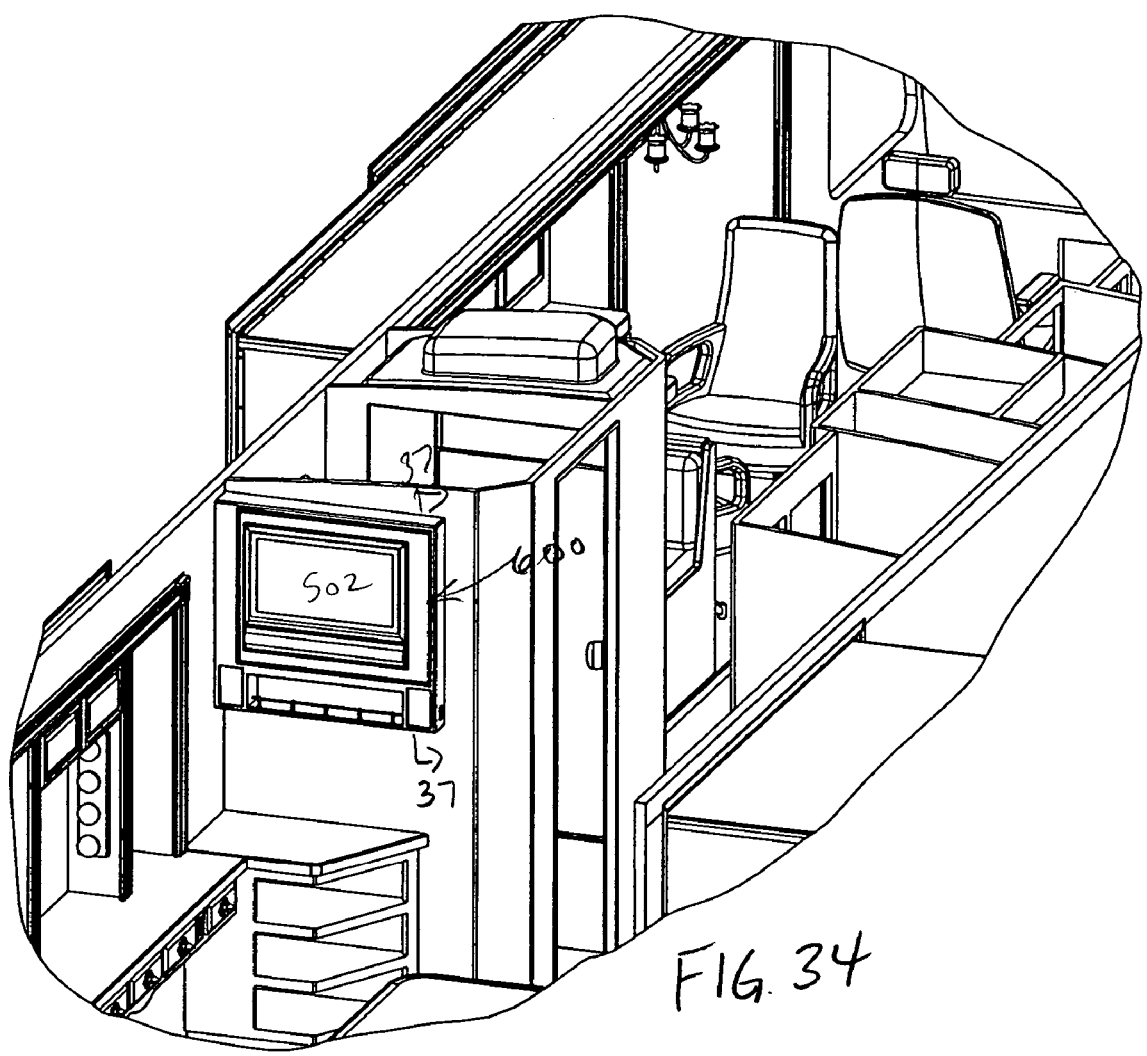
FIG. 34 is a partial interior perspective view showing a wall mounted articulating display mount with the display stowed.
Figure 35:
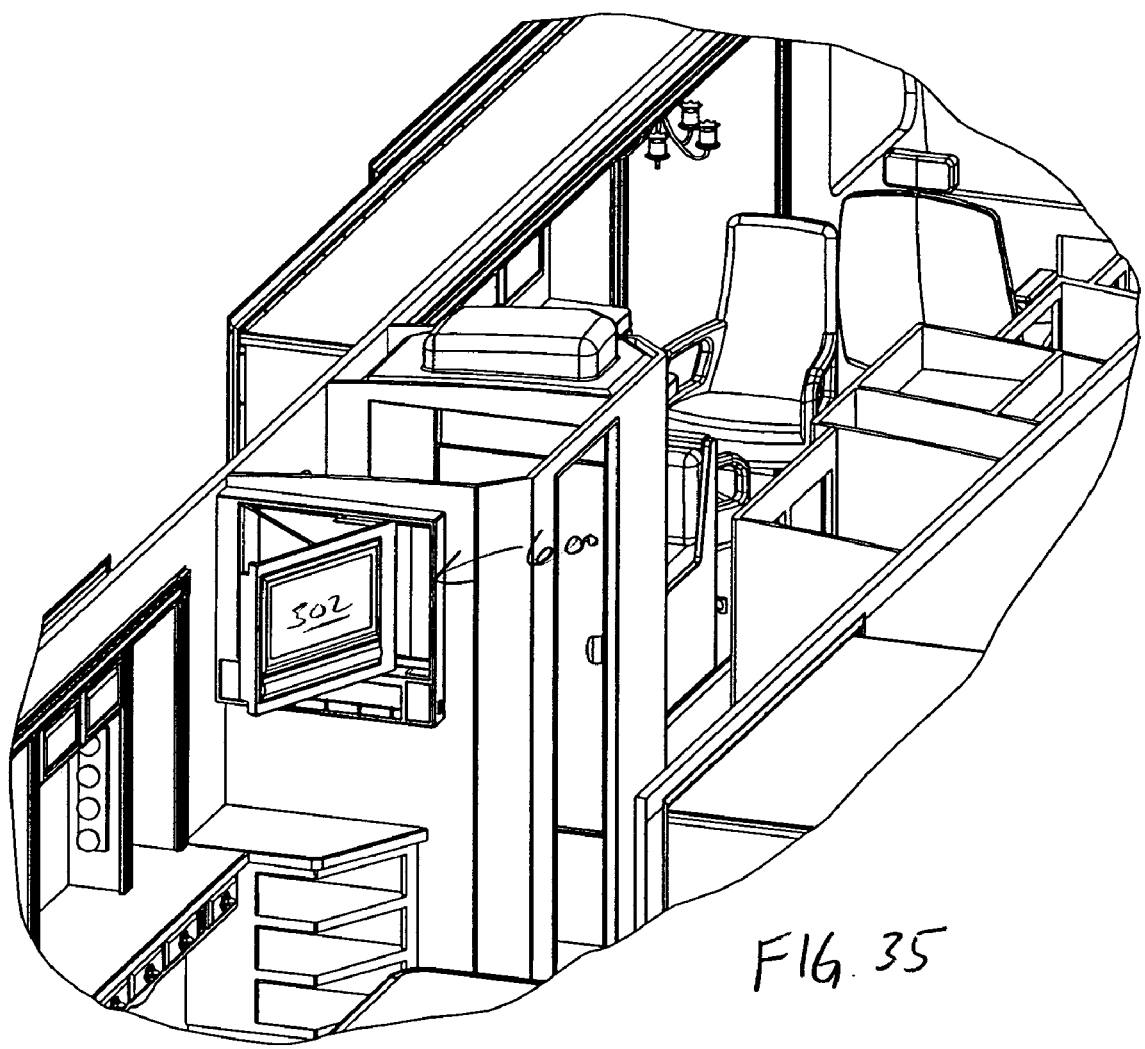
FIG. 35 is a view similar to FIG. 34 albeit showing the display extended to a viewing position.
Figure 36:
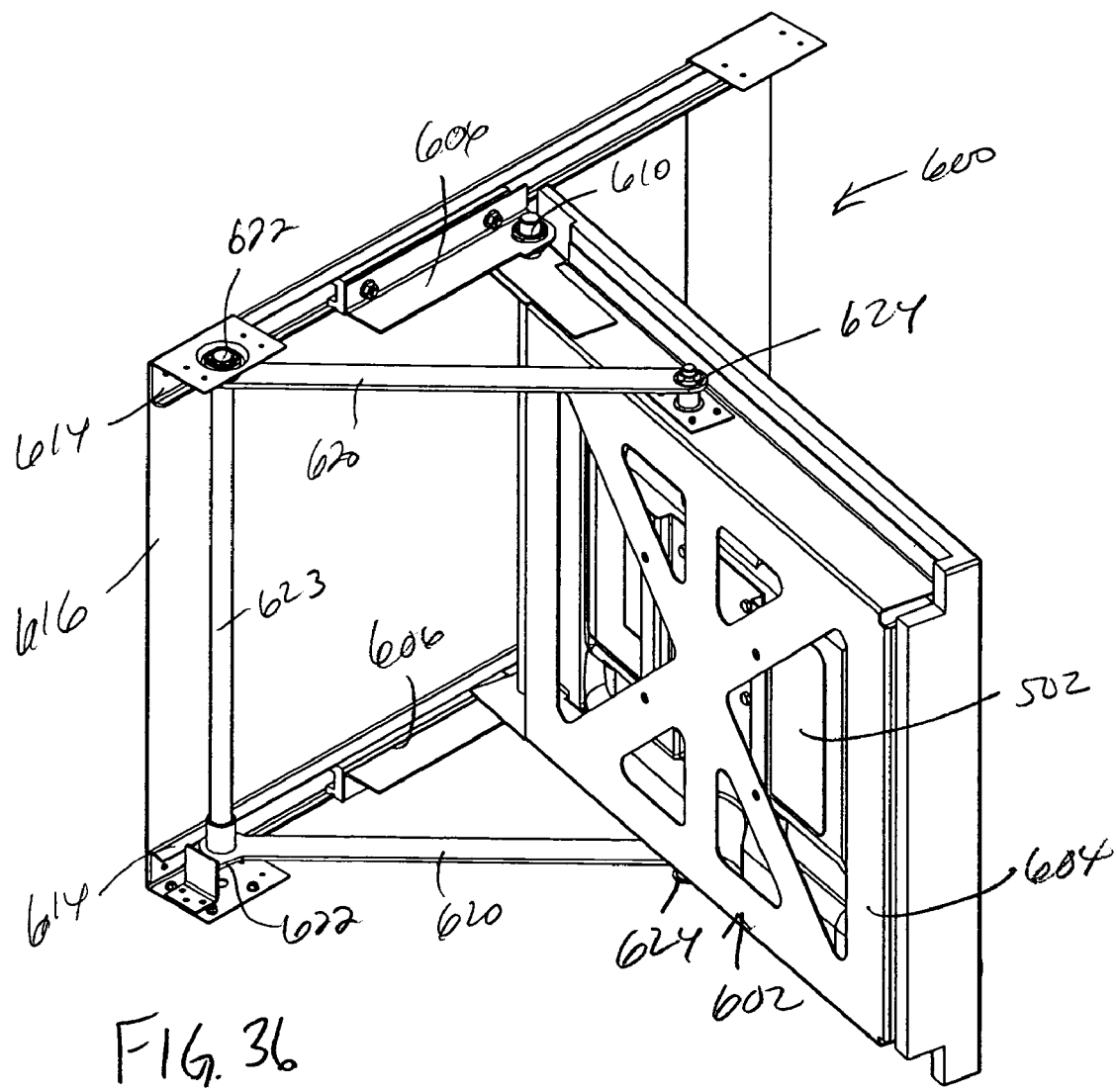
FIG. 36 is a perspective view of the mount of FIG. 34 in the extended position.
Figure 37:
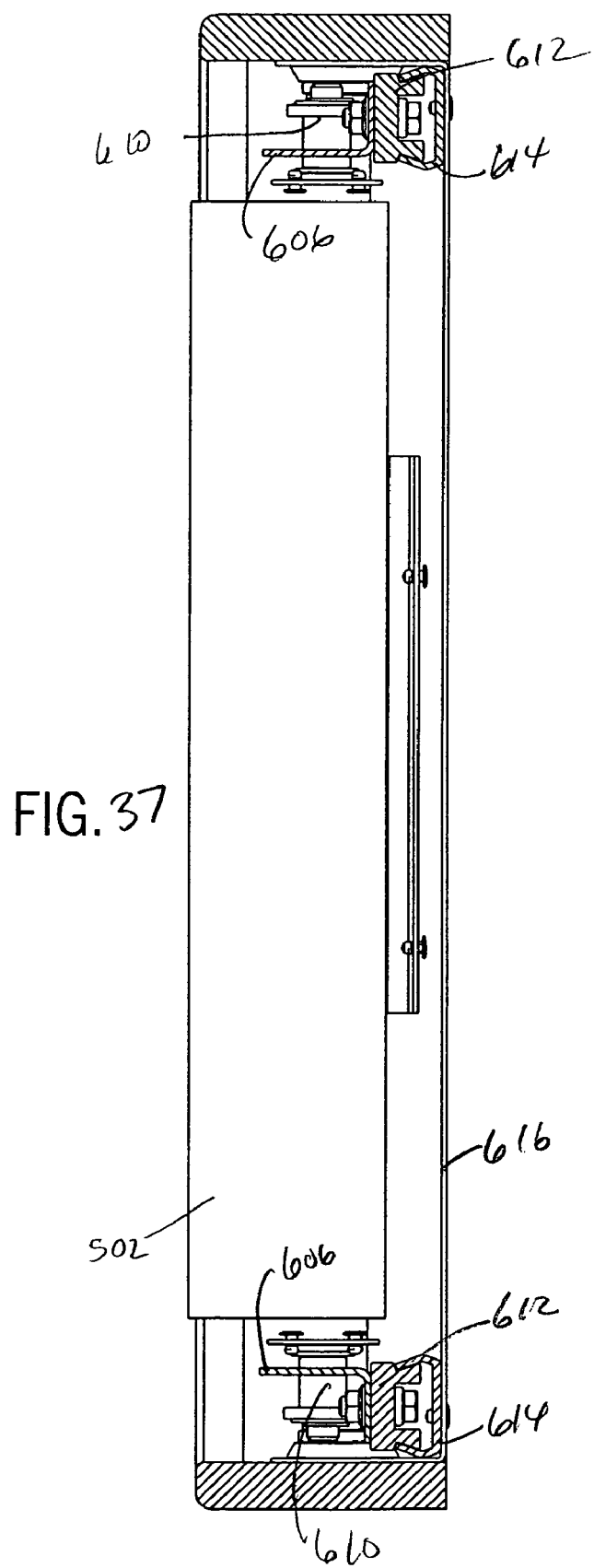
FIG. 37 is a sectional view taken along line 37-37 of FIG. 34.

The lift mount 500 is designed to mount a display 502 in a stowed position that is below the normal viewing height of people, generally below table height, so as not to obstruct windows or interfere with table and counter space. For example, the display 502 could be mounted in a small cabinet 504 (with the cabinet top being mounted at the top of the display 502) adjacent to a folding dinette table, as shown in FIGS. 28 and 29, or adjacent to a folding sofa or bed, or it could be built into a bench of a dinette booth. In any event, the mount 500 will raise the display from the stowed position, shown in FIG. 28, in which the display 502 is lowered and preferably concealed to an elevated position, as shown in FIG. 29, in which the display is at an appropriate height for viewing.

The lift mount 500 has a carriage 506 including a support brace 508 mounted to the back of the display 502 and two glide brackets 510 mounted to the brace 508 at its lower two corners. Each of the brackets 510 supports four glides 512 that are arranged in two spaced apart columns so as to ride within two vertical tracks 514 which are part of a guide frame 516, which can be a separate component or part of the cabinet 504. As in the other assemblies described above, the glides 512 can be rollers or sliders, and preferably they have a v-shaped groove so as to mate with the v-shape tracks 514. The glide and track arrangement allows the carriage to roll or slide the display 502 up and down smoothly between stowed and elevated positions.

The carriage 506 is raised and lowered by a lift assembly 520 including a pair of gas (e.g., air) springs 522, a drive unit 524 and a cable and sheave arrangement 526. The drive unit 524 is mounted at the bottom of the cabinet 504 by a bracket 525 and includes an electric motor 526, gear box 528, and a shaft mounted drum 530 rotated by the motor 526. The drum 530 defines two spool sections 532 and 534. A lifting cable 536 wraps about the spool section 532 from one side of the axis of the drum 530 and a lowering cable 538 wraps about the spool section 534 from the opposite side of the drum axis. As the drum 530 is rotated one direction, the lifting cable 536 is being wound while the lowering cable 538 is being unwound such that the carriage 506 is raised, and the opposite happens when the drum 530 is turned the opposite direction to lower the carriage 506.

The lower ends of the cables 536 and 538 are clamped or bolted to the motor bracket 525, and their upper ends are mounted using cable tensioners 540 to a lower part of (or a bracket attached thereto) the carriage support brace 508. The lifting cable 536 wraps around a fixed height sheave 542 mounted to the center of a cross-member at the top of the cabinet (or guide frame) and a sheave 544 mounted to the lower part of the carriage support brace 508. The lowering cable 538 wraps around a different sheave 546 mounted to the lower part of the carriage support brace 508. In this way, the two cables 536 and 538 wind and unwind from the drum 530 simultaneously to raise or lower the carriage 506 depending on the direction the drum 530 is rotated.

Cylinder ends 550 of the gas springs 522 are mounted to the motor bracket 525 and their plunger ends 552 are mounted to the lower ends of the glide brackets 510. The gas springs 522 mount to an upper end of the motor bracket 525 at a sufficient height such that the plunger ends 552 are vertically below the cylinder ends 550 when the carriage 506 is lowered to stow the display 502 such that they apply a downward force tending to keep the display in the stowed position. And, the plunger ends 552 are vertically above the cylinder ends 550 when the carriage 506 is raised to elevate the display 502 such that they apply an upward force tending to support the display in the elevated position. The gas springs 522 are thus over-center mounted such that as the carriage 506 is raised they apply a lifting force only after the plunger ends 552 are above the cylinder ends 550 and a lowering force only after the plunger ends 552 are below the cylinder ends 550. The gas springs 522 thus work to support the elevated display and keep it stowed as well as to provide a smooth lifting and lowering motion.

Referring now to FIGS. 34-37, the articulating mount 600 has a carriage 602 with a support brace 604 that mounts to the back of the display and two glide brackets 606 mounted to the upper and lower corners of one side (right in the drawings) of the support brace 604. The support brace 604 is mounted to the glide brackets 606 at two pivot connections 610 which extend along a common vertical pivot axis.

Each of the glide brackets 606 supports two glides 612 at each end that ride within two horizontal tracks 614 of a guide frame 616, which can be a separate component or part of an enclosure. Again, these glides 612 can be rollers or sliders and preferably have a v-shaped groove so as to mate with the v-shape tracks 614.

Two swing arms 620 are pivotally mounted between the tracks 614 and the top and bottom sides of the support brace 604. In particular, one end of each swing arm 620 is mounted at a pivot connection 622 at the end of a shaft 623 that is aligned about a vertical pivot axis at an end of the tracks 614 (left in the drawings) opposite the pivotal connection of the support brace 604 and the glide brackets 606. The other ends of the swing arms 620 are mounted to pivot connections 624 aligned about a vertical pivot axis at an intermediate location near the horizontal center of the support brace 604.

The mount 600 thus support the display 502 between a stowed or retracted position in which the support brace 604 is essentially parallel with the tracks 614 and one of many angled extended positions in which the support brace 604 is pivoted out at an angle with respect to the tracks 614. In moving from the stowed to the extend positions, the carriage 602 both translates linearly along the tracks 614 and pivots at the pivotal connection between the support brace 604 and the glide brackets 606. The swing arms 620 pivot out as well to help support the weight of the display.

In one preferred mounting location, the mount 600 can be mounted to a wall at or near a corner of a room of the vehicle. When the display is swung out it would cut in front of the corner at an angle and provide a wide viewing angle to the display in that room. And, the free end of the display could abut the adjacent wall rather than extending into a path for walking inside the vehicle. Further, a catch or fixed support could be mounted on that wall to retain or support the free end of the display.

While a manually actuated mount has been shown and described herein, the mount could also be powered. For example, an electric motor drive and gear box could be added to drive the swing arms, thereby pivoting and translating the display between retracted and extended positions. Or, the swing arms could be gas spring, tending to pivot out the display when not held in the retracted position. A suitable powered cable and sheave arrangement could also be employed.

It should be appreciated that merely preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. In a vehicle having a cargo storage area, a cargo slide-out comprising:
a drawer for containing vehicle cargo having a bottom and upright side walls at opposite first and second sides of the drawer;
a guide frame having upright side walls at the first and second sides of the drawer at an outside of the drawer;
a first set of glides mounted to each of the drawer side walls to extend toward the associated guide frame side wall;
a second set of glides mounted to each of the guide frame side walls to extend toward the associated drawer side wall; and
at least one track at each of the first and second sides of the drawer engaging the associated first and second sets of glides to connect the drawer to the guide frame and allow the drawer to move relative to the guide frame such that a back end of the drawer is proximate a front end of the guide frame in an extended position of the drawer;
wherein the at least one track at each of the first and second sides of the drawer is movable with respect to the drawer and the guide frame;
wherein each track is a double-run track having a first section engaging the associated first set of glides of the associated drawer side wall and a second section engaging the associated second set of glides of the associated guide frame side wall;
wherein the first track section defines two parallel grooves which engage the associated first set of glides of the associated drawer side wall.

2. The cargo slide-out of claim 1, wherein there is only one track at each of the first and second sides of the drawer.

3. The cargo slide-out of claim 1, wherein the first track section is at least one groove.

4. The cargo slide-out of claim 3, wherein the at least one groove is v-shaped.

5. The cargo slide-out of claim 1, wherein the second track section is at least one rail.

6. The cargo slide-out of claim 5, wherein the at least one rail is v-shaped.

7. The cargo slide-out of claim 1, wherein the second track section defines two rails, each rail engaging at least one of the associated second set of glides of the associated guide frame side wall.

8. The cargo slide-out of claim 7, wherein the first track section grooves are v-shaped and the second track section rails are v-shaped surfaces.

9. The cargo slide-out of claim 8, wherein the glides are rotatably mounted rollers with v-shaped surfaces matable with the first and second track sections.

10. The cargo slide-out of claim 9, wherein the glides are fixedly mounted sliders of low friction material with v-shaped surfaces matable with the first and second track sections.

11. In a vehicle having a cargo storage area, a cargo slide-out comprising:
a drawer for containing vehicle cargo having a bottom and upright side walls at opposite first and second sides of the drawer;
a guide frame having upright side walls at the first and second sides of the drawer to an outside of the drawer;
a first set of glides mounted to each of the drawer side walls to extend toward the associated guide frame side wall;
a second set of glides mounted to each of the guide frame side walls to extend toward the associated drawer side wall; and
at least one track at each of the first and second sides of the drawer engaging the associated first and second sets of glides to connect the drawer to the guide frame and allow the drawer to slide relative to the guide frame such that a back end of the drawer is proximate a front end of the guide frame in an extended position of the drawer;
wherein the at least one track at each of the first and second sides of the drawer is slideable with respect to the drawer and the guide frame;
wherein there is only one track at each of the first and second sides of the drawer;
wherein each track is a double-run track having a first section engaging the associated first set of glides of the associated drawer side wall and a second section engaging the associated second set of glides of the associated guide frame side wall;
wherein the track has an E-shaped vertical cross-section.

12. The cargo slide-out of claim 11, wherein the track is extruded aluminum.

13. The cargo slide-out of claim 11, wherein the first set of glides align along one or more rows that are vertically between one or more rows of the associated second set of glides.

14. The cargo slide-out of claim 1, wherein the drawer has a rear compartment that is of a height less than a height of a basement area of the vehicle between a vehicle frame member and a stationary floor of the vehicle.

15. In a vehicle having a cargo storage area, a cargo slide-out comprising:
a drawer for containing vehicle cargo having a bottom and upright side walls at opposite first and second sides of the drawer;
a guide frame having upright side walls at the first and second sides of the drawer at an outside of the drawer;
a first set of glides at the first side of the drawer at least one of which is mounted to the associated drawer side wall to extend toward the guide frame and at least one of which is mounted to the associated guide frame side wall to extend toward the drawer;
a second set of glides at the second side of the drawer at least one of which is mounted to the associated drawer side wall to extend toward the guide frame and at least one of which is mounted to the associated guide frame side wall to extend toward the drawer;
a first double-run track disposed between the drawer and the guide frame at the first side of the drawer and engaging the first set of glides; and
a second double-run track disposed between the drawer and the guide frame at the second side of the drawer and engaging the second set of glides;
wherein engagement of the first and second tracks and the respective first and second glides connect the drawer to the guide frame and allow the drawer to move relative to the guide frame such that a back end of the drawer can be brought proximate a front end of the guide frame in an extended position of the drawer;
wherein the first and second tracks each define a pair of v-shaped grooves and a pair of v-shaped rails.

16. The cargo slide-out of claim 15, wherein the grooves are vertically between the rails.

17. The cargo-slide-out of claim 16, wherein the first and second tracks are E-shaped.

18. The cargo slide-out of claim 17, wherein each of the first and second set of glides is selected from the group of friction reducing members consisting of rollers and sliders.

19. The cargo slide-out of claim 18, wherein each glide defines a v-shaped surface matable with the grooves and rails of the first and second tracks.

20. The cargo slide-out of claim 15, wherein the first and second tracks are slideable with respect to the drawer and the guide frame.

* * * * *